United States Patent

Kuroiwa et al.

[11] Patent Number: 5,826,208
[45] Date of Patent: Oct. 20, 1998

[54] POWERTRAIN CONTROL DEVICE FOR A VEHICLE USING TARGETED TONGUE GENERATION FOR ELIMINATING SHIFT SHOCK

[75] Inventors: Hiroshi Kuroiwa, Hitachi; Masahiko Ibamoto, Hitachinaka; Kazuhiko Sato, Hitachiohta; Mitsuyoshi Okada, Hitachinaka; Masami Shida, Mito, all of Japan

[73] Assignees: Hitachi, Ltd.; Hitachi Car Engineering Co., Ltd., both of Japan

[21] Appl. No.: 548,470

[22] Filed: Oct. 26, 1995

[30] Foreign Application Priority Data

Oct. 26, 1994 [JP] Japan .................................. 6-262283
Apr. 21, 1995 [JP] Japan .................................. 7-096614

[51] Int. Cl.⁶ .............................................. F16H 59/14
[52] U.S. Cl. .............................. 701/54; 477/115; 701/64
[58] Field of Search ................... 364/424.082, 424.083, 364/424.087, 424.089, 431.051; 477/107, 109, 110, 115, 129, 156; 701/53, 54, 55, 56, 58, 60, 64, 66

[56] References Cited

U.S. PATENT DOCUMENTS

| | | | |
|---|---|---|---|
| 4,266,447 | 5/1981 | Heess et al. ............................. | 74/858 |
| 4,403,527 | 9/1983 | Mohl et al. ............................. | 74/851 |
| 5,069,181 | 12/1991 | Togai et al. ............................. | 123/399 |
| 5,400,865 | 3/1995 | Togai et al. ......................... | 123/403 X |
| 5,508,923 | 4/1996 | Ibamoto et al. ............. | 364/424.087 X |
| 5,580,331 | 12/1996 | Shiraishi et al. ........................ | 477/109 |
| 5,605,131 | 2/1997 | Ohno et al. .............................. | 123/399 |
| 5,613,920 | 3/1997 | Uno et al. ................................ | 477/109 |
| 5,620,393 | 4/1997 | Minowa et al. .......................... | 477/155 |

FOREIGN PATENT DOCUMENTS

| | | |
|---|---|---|
| 61-135831 | 6/1986 | Japan . |
| 2-38748 | 2/1990 | Japan . |
| 2-20817 | 5/1990 | Japan . |
| 4-81658 | 12/1992 | Japan . |
| 5-5688 | 1/1993 | Japan . |
| 5-7213 | 1/1993 | Japan . |

*Primary Examiner*—Michael Zanelli
*Assistant Examiner*—Edward J. Pipala
*Attorney, Agent, or Firm*—Evenson, McKeown, Edwards & Lenahan, P.L.L.C.

[57] ABSTRACT

The object of this invention is to reduce shift shocks by controlling the driving torque during gear shift changing so that the driving torque is represented by a smooth, ideal waveform. The driving torque calculating means estimates the output shaft torque of the automatic transmission from the engine torque characteristic or torque converter characteristic and, based on the estimated driving torque, generate a targeted torque pattern during gear shift changing. The engine torque control value calculating means calculates the control value for controlling the engine output torque, i.e., an ignition timing correction value $\Delta\theta ig$, so as to eliminate the deviation between the targeted torque and the driving torque estimated by the driving torque calculating means. This ignition timing correction approximates the driving torque to smooth the targeted torque.

24 Claims, 18 Drawing Sheets

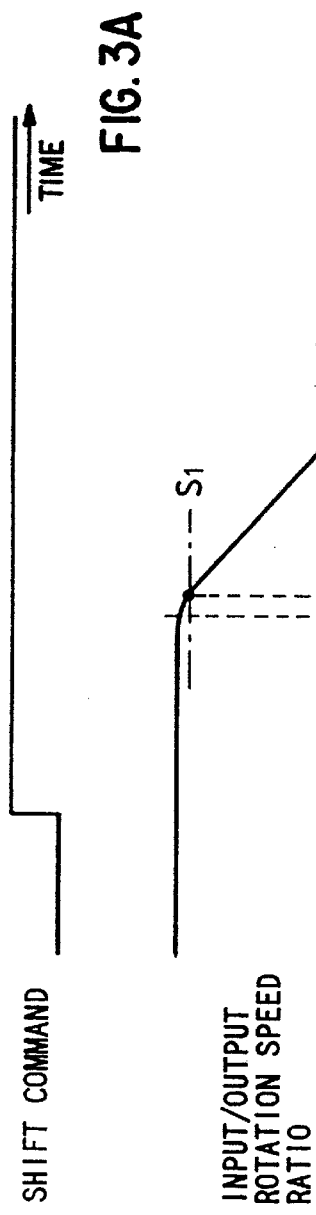
FIG. 3A
FIG. 3B
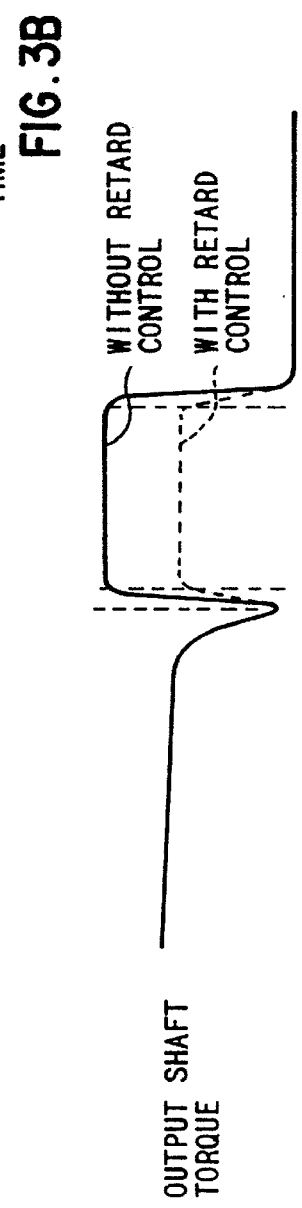
FIG. 3C
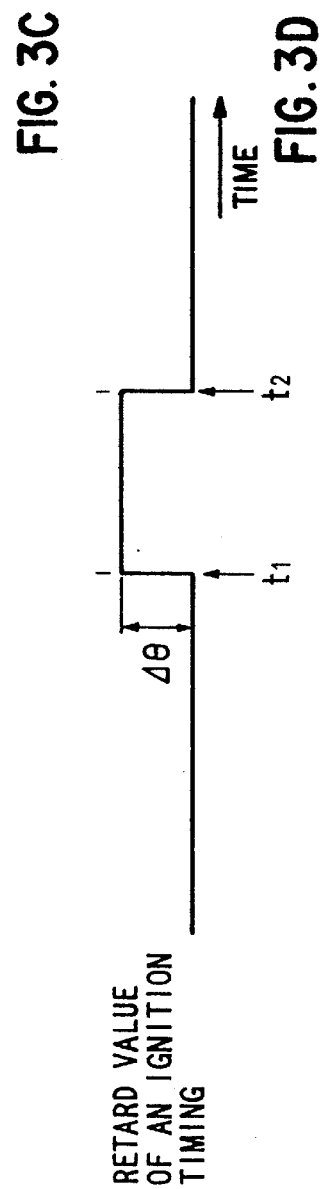
FIG. 3D

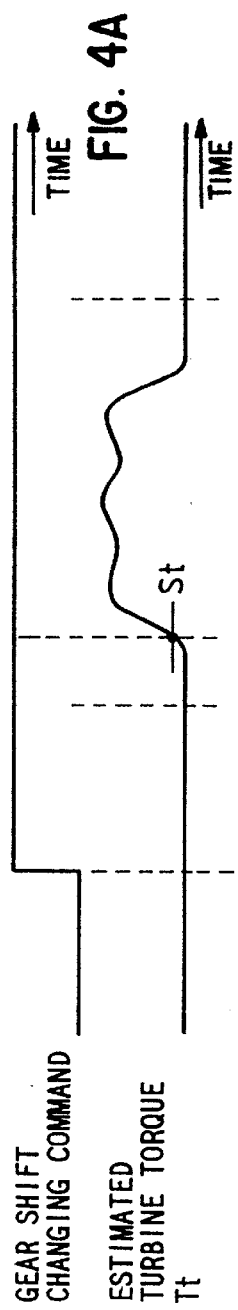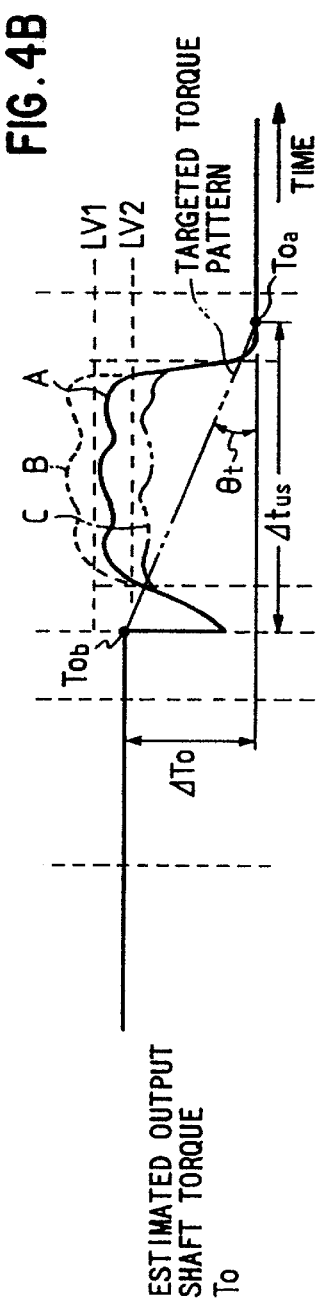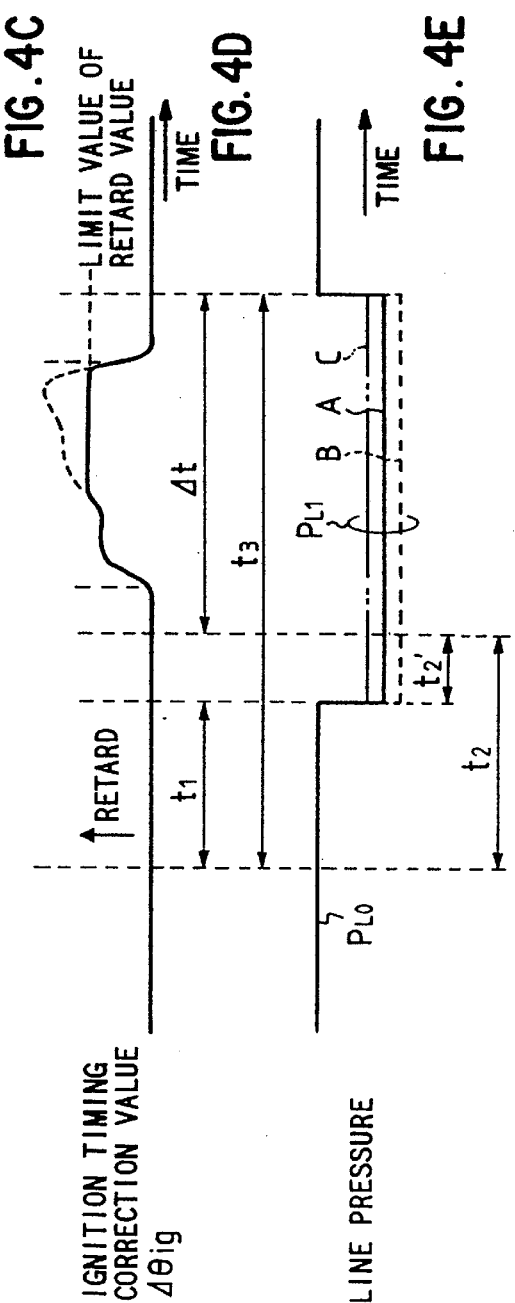

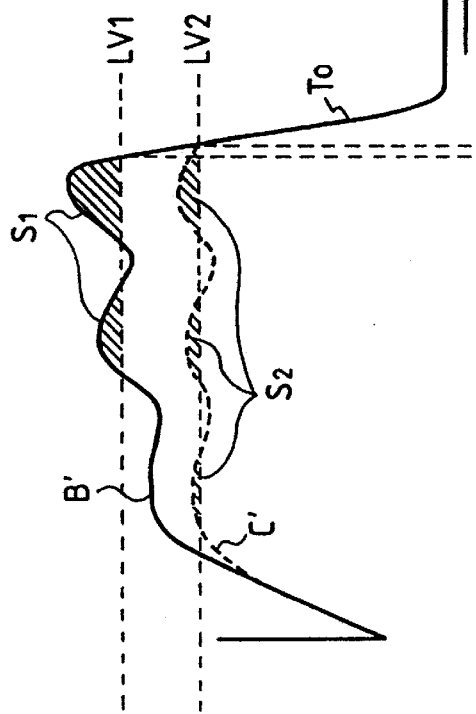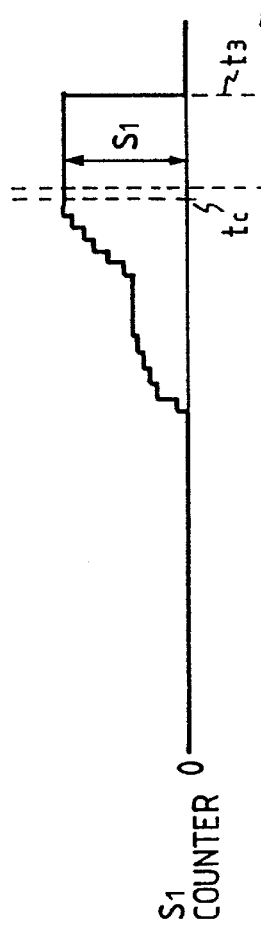

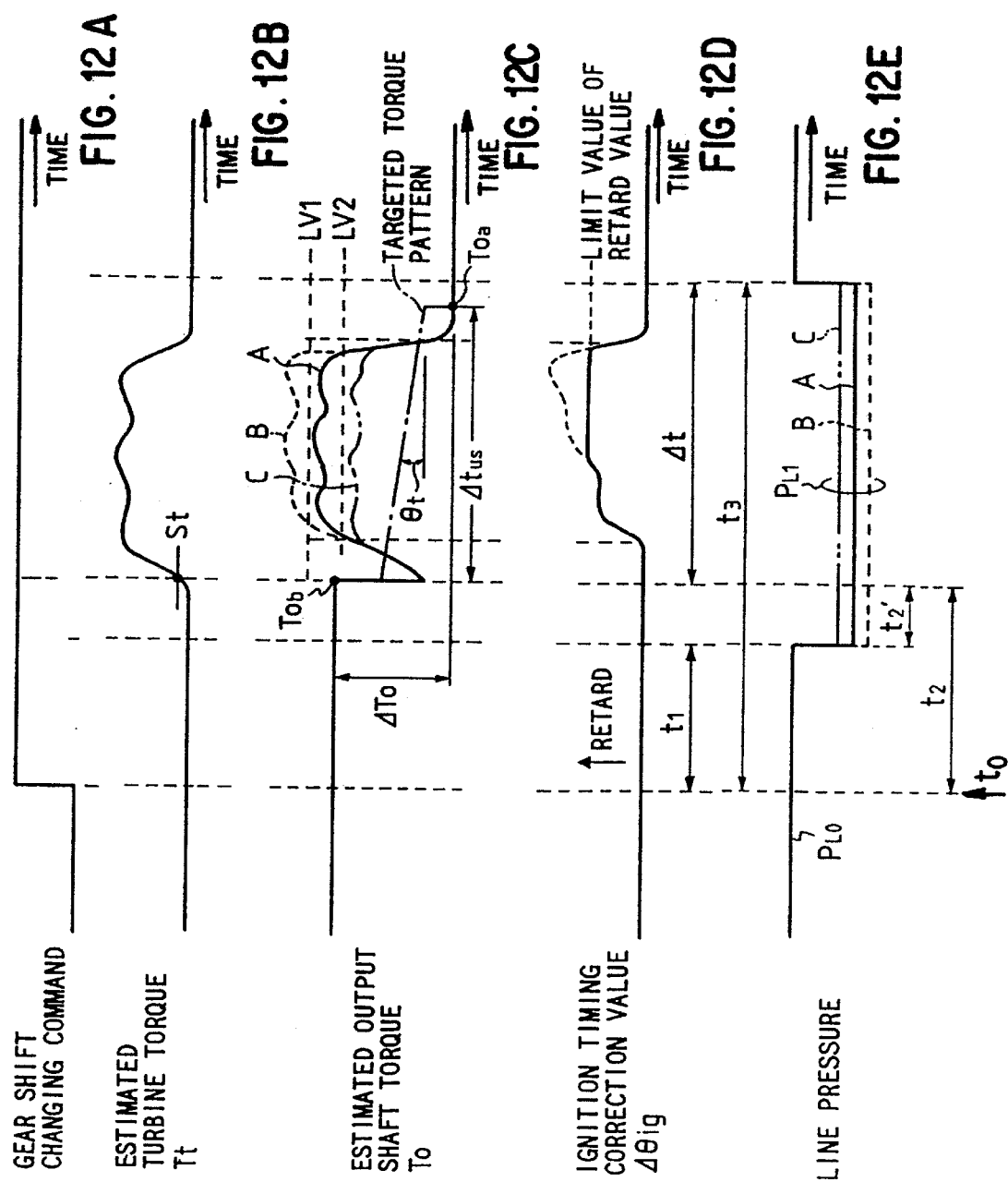

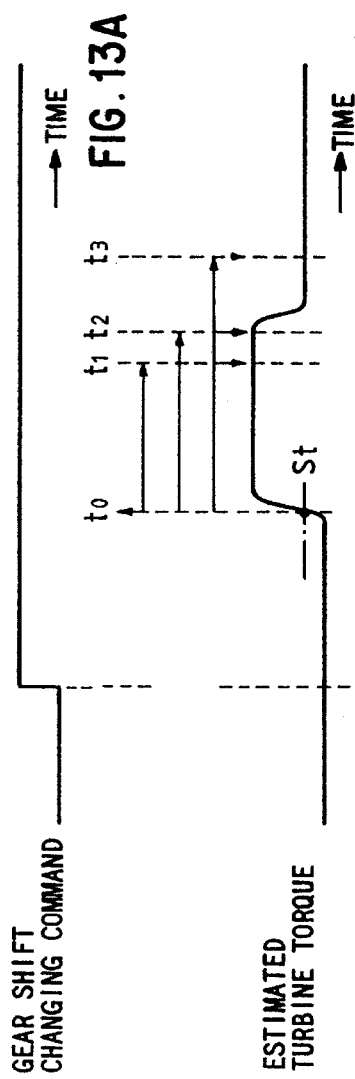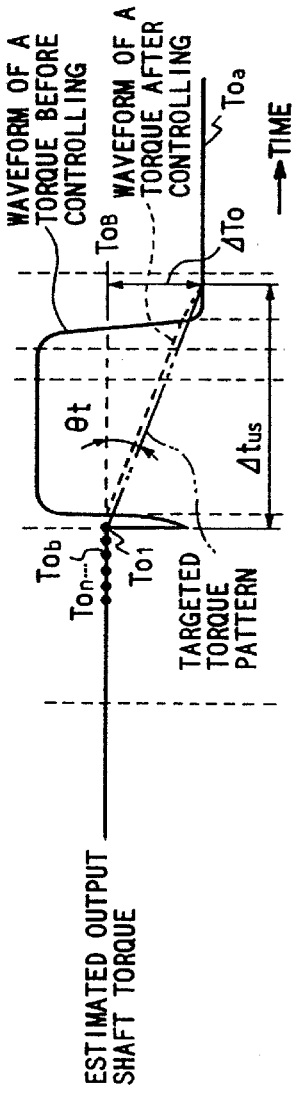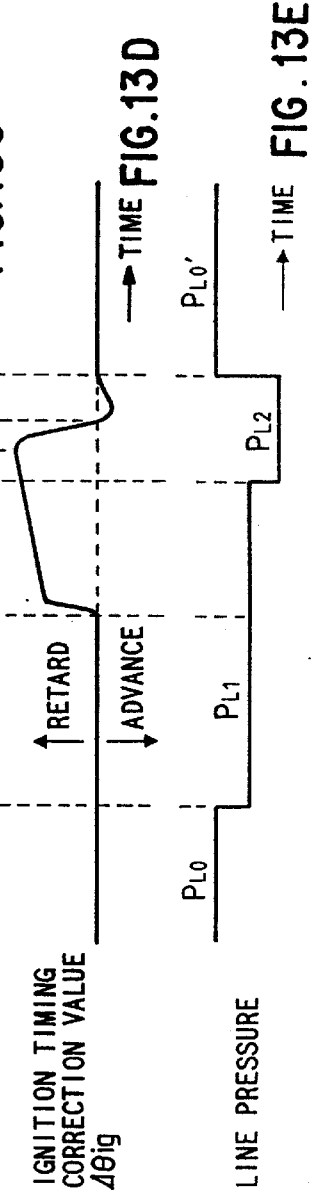
FIG. 13A FIG. 13B FIG. 13C FIG. 13D FIG. 13E

| GEAR SHIFT CHANGING | $\Delta tus$ | $t_1$ | $t_2$ | $t_3$ |
|---|---|---|---|---|
| 1→2 | $A_{12S}$ | $A_{121}$ | $A_{122}$ | $A_{123}$ |
| 2→3 | $A_{23S}$ | $A_{231}$ | $A_{232}$ | $A_{233}$ |
| 3→4 | $A_{34S}$ | $A_{341}$ | $A_{342}$ | $A_{343}$ |

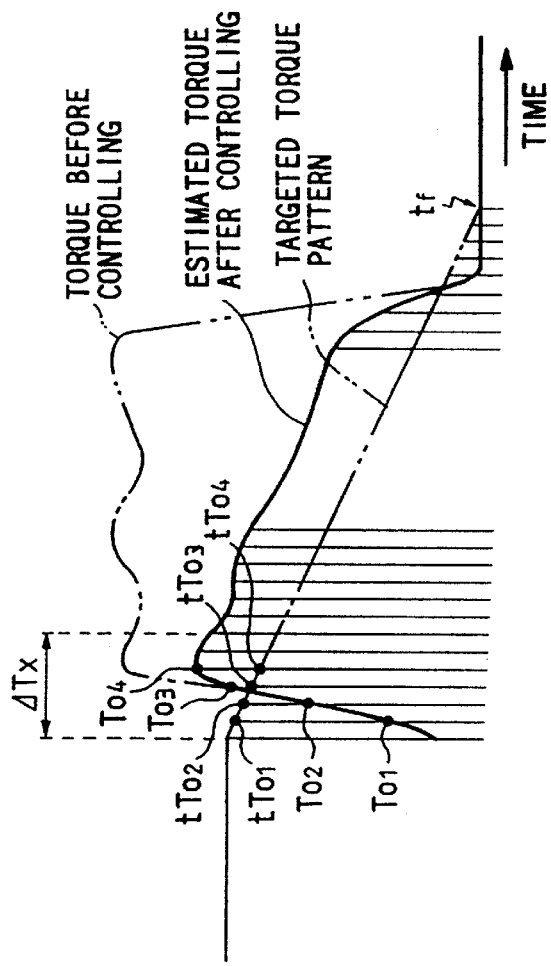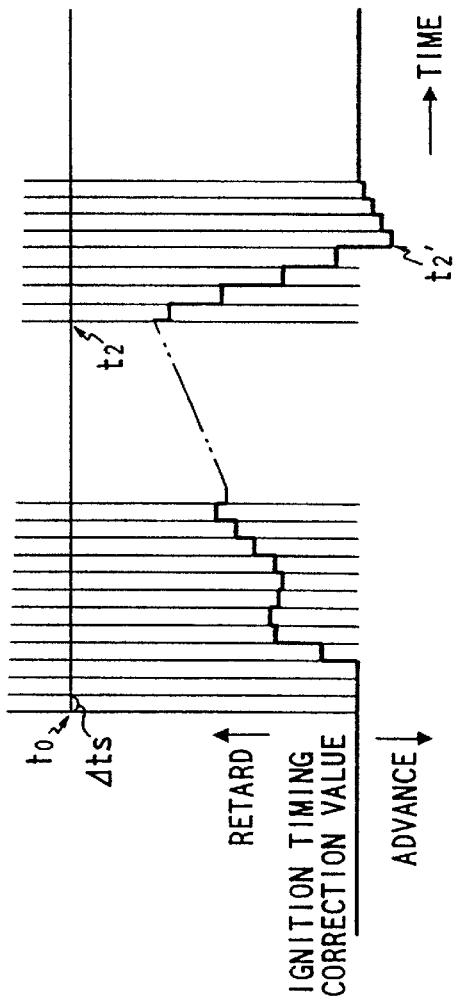

POWERTRAIN CONTROL DEVICE FOR A VEHICLE USING TARGETED TONGUE GENERATION FOR ELIMINATING SHIFT SHOCK

FIELD OF THE INVENTION

The present invention relates to a method of controlling a vehicle with an automatic transmission and more particularly to an automotive powertrain control device that reduces torque fluctuation generated at gear shift changing, so-called shift shock.

BACKGROUND OF THE INVENTION

Among conventional control methods of this kind are one described in Japanese Patent Publication No. 20817/1990, in which the starting and ending points of an engine torque down control to reduce shift shocks are determined based on the engine rotation speed at the start of gear shift changing; one described in Japanese Patent Publication No. 5688/1993, in which the starting and ending points of the engine torque down control to reduce shift shocks are determined based on the input/output rotation speed ratio, i.e., the ratio of the input shaft rotation speed (turbine rotation speed) and the output shaft rotation speed (called a vehicle speed signal); and one described in Japanese Patent Publication No. 81658/1992, which determines the starting point of the engine torque down control by the first method described above and the ending point of this control by the second method described above.

The engine torque down control of this kind of conventional control, as described in Japanese Patent Publication No. 7213/1993, generally switches from a normal characteristic data memory of the engine control device to a gear shift changing characteristic data memory during the above-mentioned period, and is required to search, through pre-stored maps, for the control timing and control value for every gear position and engine load, and to control them.

FIG. 3 is a time chart that explains the shift shock reduction method using the above-mentioned conventional technique. This method uses an ignition timing as the control value for engine torque down. Control timings t1, t2 are determined to be the times when the input/output rotation speed ratio exceeds prestored set values S1, S2. In this control period between t1 and t2, a prestored control value, i.e., an ignition timing retard angle $\Delta\theta$, is read out and added to a base ignition timing.

Hence, the corrected control value in this correction control period is constant. When the output shaft torque in this control period is almost flat as shown, the retard control mentioned above can reduce torque fluctuation significantly. In other words, a so-called shift shock reduction effect is produced. The actual torque waveforms, however, vary greatly during that control period, making it impossible in many cases for a constant correction value to produce a sufficient correction effect.

The set values S1, S2 and ignition timing retard angle $\Delta\theta$ need to be made optimum by tuning at the development stage, requiring a very long time. Even if they can be made optimum, change with time and change in environment may render the set values thus determined inadequate for control, making it difficult to completely reducing the shift shocks.

SUMMARY OF THE INVENTION

The object of this invention is to provide a control device and method, which reduces the development man-hour by eliminating as many parts as possible that require tuning and which can automatically follow up change with time and change in environment to reduce shift shocks.

The object is achieved by a powertrain control device for vehicles which includes an automatic transmission having a torque converter; a control device incorporating at least one microcomputer and controlling the engine and the automatic transmission; a driving torque calculating means for estimating the torque of the output shaft of the automatic transmission; a targeted torque generating means for producing a targeted torque based on the driving torque estimated by the driving torque calculating means, an engine torque control value calculating means for calculating a control value for controlling the output torque of the engine from the deviation between the targeted torque generated by the target torque generating means and the driving torque estimated by the driving torque calculating means; an engine torque control value limiting means in the engine torque control value calculating means, for limiting the engine torque control value that exceeds a predetermined value; and an engine torque control means for controlling the output torque of the engine in response to a signal from the engine torque control value calculating means;

the automotive powertrain control device further comprising an estimated driving torque monitoring means for monitoring the magnitude of the estimated driving torque determined by the driving torque calculating means, and a line pressure control device for controlling the line pressure of the automatic transmission by the estimated driving torque monitoring means.

Because the control device of this invention with the above-mentioned configuration feedback-controls the output shaft torque of the engine so that the actual driving shaft torque approaches the targeted torque, and learns the line pressure of the automatic transmission to feedforward-control the line pressure according to the magnitude of the estimated driving shaft torque, an ideal torque control can be made at gear shift changing, significantly reducing the man-hour of the development by decreasing the number of parts which need tuning. The device can also follow up automatically change with time and change in environment to appropriately reduce shift shocks.

To achieve the above objective, the powertrain control device of this invention comprises a targeted torque pattern generating means for producing an ideal waveform of the driving shaft torque at gear shift changing, a driving torque calculating means for estimating the actual driving shaft torque with high precision, an engine torque control value calculating means for calculating the control value for controlling the output torque of the engine so that the estimated driving torque follows up the targeted torque pattern, and an engine torque control means for controlling the output torque of the engine.

The targeted torque generating means can have a function of recognizing as an actual gear shift changing timing a time when an estimated turbine torque determined by a turbine torque calculating means in the driving torque calculating means exceeds a predetermined value in a specified period of time after a gear shift change command, temporarily storing the driving torque at the actual gear shift changing timing or an average driving torque up to that timing as a driving torque before the gear shift changing; calculating a driving torque after the gear shift changing from the ratio of the driving torque before the gear shift changing to the driving torque after gear shift changing; calculating an inclination angle with respect to the elapsed time of the targeted torque from the difference between the driving torques before and after the gear shift changing and from a preset gear shift changing time; and calculating the targeted torque according to the inclination angle every predetermined cycle of calculation.

The engine torque control value calculating means can include a deviation calculating means for calculating a deviation between the targeted torque value generated every predetermined cycle of calculation by the targeted torque generating means and the driving torque value calculated by the driving torque calculating means, and an engine torque control value converting means for calculating an engine torque control value by multiplying the deviation determined by the deviation calculating means by a preset conversion coefficient. The conversion coefficient is preferably set to zero when the driving torque value in a first predetermined period after the actual gear shift changing timing is smaller than the targeted torque value, to a predetermined characteristic value when the driving torque value is greater than the targeted torque value in a second predetermined period, longer than the first period after the actual gear shift changing timing; and to a value during a period beyond the second predetermined period, which is determined by dividing the predetermined characteristic value by the coefficient of the elapsed time.

The driving torque calculating means preferably includes a first driving torque calculating means for estimating the driving torque by using a prestored engine torque characteristic, a second driving torque calculating means for estimating the driving torque by using a prestored torque converter characteristic, and a switching means for switching the calculation by the second driving torque calculating means in a region where the slip of the torque converter is small to the calculation by the first driving torque calculating means in a region where the slip is small in order to estimate the torque of the output shaft of the automatic transmission. The load torque of accessory devices of the engine is preferably learned from the deviation between the driving torques generated by the first and second driving torque calculating means and corrected when using the first driving torque calculating means.

The first driving torque calculating means for estimating the driving torque by using the engine torque characteristic can include an engine torque characteristic memory means for storing the engine torque characteristic beforehand, a means for calculating the slip ratio of the torque converter, a means for calculating the torque ratio of the torque converter by receiving the slip ratio information from the slip ratio calculating means, a turbine torque calculating means for outputting the output shaft torque of the torque converter determined by multiplying the engine torque read from the engine torque characteristic memory means by the torque ratio output from the torque ratio calculating means, and an automatic transmission output shaft torque calculating means for outputting the output shaft torque of the automatic transmission by multiplying the output shaft torque of the torque converter output from the turbine torque calculating means by the gear ratio of the engaged gear position at present.

The engine torque characteristic memory means can store the engine torque by taking as parameters the accelerator pedal opening or throttle value opening and the engine rotation speed, the intake air mass flow and engine rotation speed, the intake air pressure, intake air temperature and engine rotation speed, or the pulse width for operating a fuel injector and engine rotation speed.

The second driving torque calculating means for estimating the driving torque by using the characteristic of the torque converter can include a memory means for storing the characteristics of the input capacity coefficient of the torque converter, a means for calculating the slip ratio of the torque converter, a means for calculating the torque ratio of the torque converter by receiving the slip ratio information from the slip ratio calculating means, a torque converter input torque calculating means for calculating the torque converter input torque by multiplying the pump capacity coefficient read from the means for storing the characteristics of the input capacity coefficient by an engine rotation speed squaring signal output from an engine rotation speed squaring means, a turbine torque calculating means for outputting the output shaft torque of the torque converter determined by multiplying the torque ratio output from the torque ratio calculating means by the input torque of the torque converter from the torque converter input torque calculating means, and an automatic transmission output shaft torque calculating means for calculating the output shaft torque of the automatic transmission by multiplying the output shaft torque of the torque converter output from the turbine torque calculating means by the gear ratio of the engaged gear position at present.

According to this invention, the output shaft torque of the engine is feedback-controlled so that the actual driving shaft torque is equal to the targeted torque. This enables an ideal torque control at gear shift changing and hence a significant reduction in the man-hour required for tuning. This control also allows the device to follow up automatically change with time and change in environment, reducing shift shocks.

In calculating the engine torque control value by multiplying the deviation between the targeted torque value and the estimated driving torque value by the conversion coefficient which is preset and stored beforehand, the conversion coefficient is varied with time from the actual gear shift changing timing. This avoids the possibility of overcorrection and allows smooth connection of the driving torque during gear shift changing to the driving torque during the normal running after gear shift changing.

The driving torque calculating means comprises a first driving torque calculating means that utilizes the engine torque characteristics and a second driving torque calculating means that utilizes the characteristics of the torque converter. In a region where the slip of the torque converter is large, the second driving torque calculating means is used and, in a region where the slip is small, the first driving torque calculating means is used, thereby enhancing the precision of estimation of the driving torque.

Adoption of the driving torque estimation method for estimating the driving torque through map search based on the measurement parameters, such as accelerator pedal opening, throttle valve opening, engine rotation speed, intake air mass flow, intake air pressure, intake air temperature, pulse width for operating the fuel injector and torque converter slip ratio, allows the driving torque control that uses only the existing sensors incorporated for engine control without requiring expensive torque sensors. This enhances the function without increasing the cost.

BRIEF DESCRIPTION OF THE DRAWINGS

FIG. 3 is a time chart showing an upshift shock and a conventional method of reducing it;

FIG. 4 is a time chart showing a method of reducing upshift shock of a first embodiment of this invention;

FIG. 7 is a diagram showing a method of comparison of the upper and lower limits with torque and a judgment method of this invention;

FIG. 12 is a time chart showing a method of reducing the upshift shock of a second embodiment of this invention;

FIG. 13 is a time chart showing a method of reducing the upshift shock of a third embodiment of this invention;

FIG. 22 is a detailed time chart showing a method of reducing the upshift shock of a fourth embodiment of this invention;

DETAILED DESCRIPTION OF THE PREFERRED EMBODIMENTS

Embodiments of this invention will be described in detail referring to the accompanying drawings.

Figure 1:
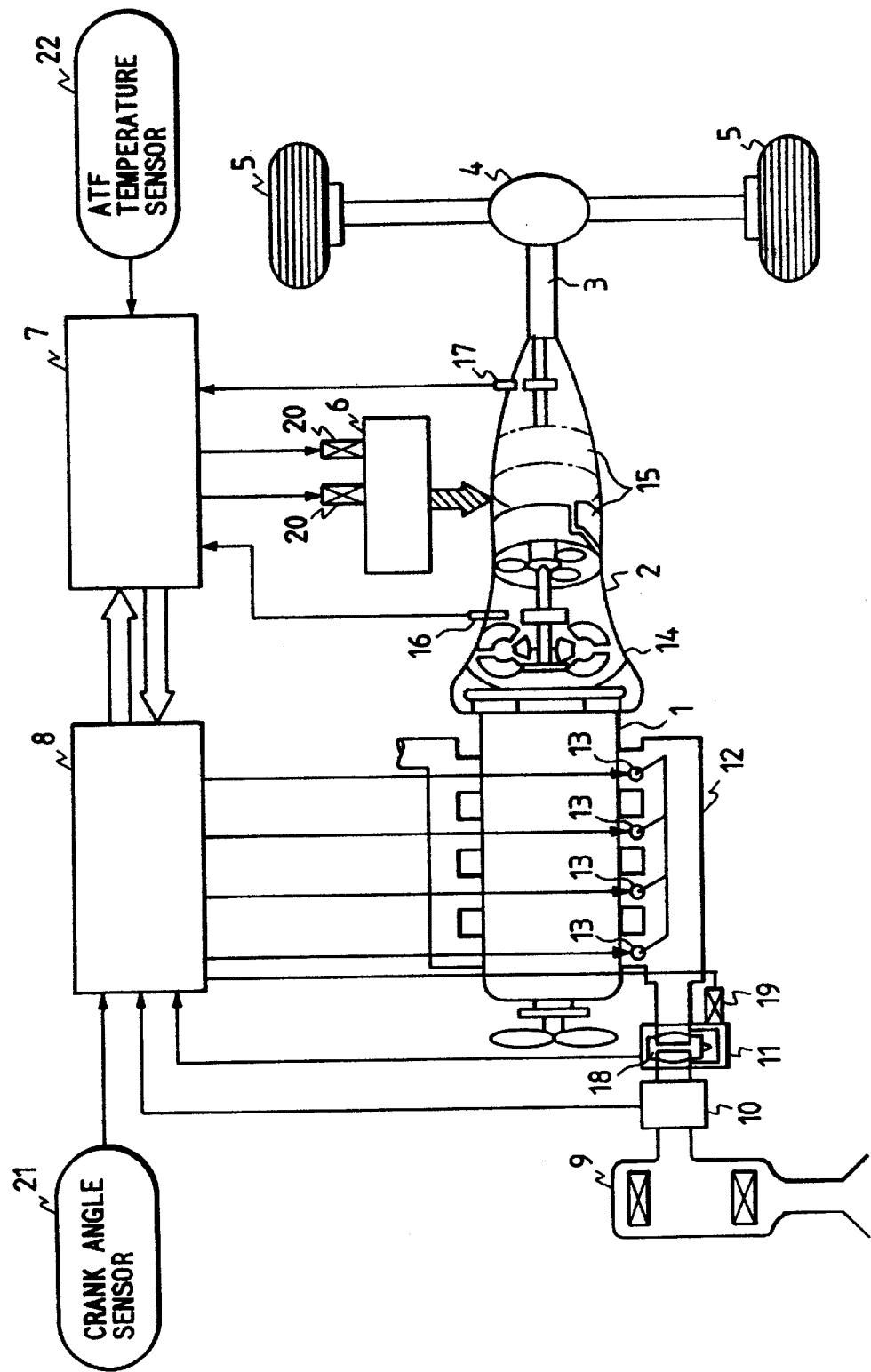
FIG. 1 is a view showing the configuration of a system to which this invention is applied.

FIG. 1 is a view showing the configuration of a system to which the present invention is applied. Reference numeral 1 represents an engine, 2 an automatic transmission (AT), 3 a propeller shaft, 4 a differential gear that also serves as a final reduction gear, 5 drive wheels, and 6 a hydraulic control circuit. Designated 7 is a control unit (electronic control device) for the AT incorporating a microcomputer, which is referred to as an ATCU. Denoted 8 is a control unit (electronic control device) for engine incorporating a microcomputer, which is simply referred to as an ECU. Denoted 9 is an air cleaner, 10 an air flow sensor, 11 a throttle chamber, 12 an intake manifold, and 13 a fuel injector for injecting fuel.

The AT 2 comprises a torque converter 14 and a gear train 15. It also includes a turbine sensor 16 for detecting the output shaft rotation speed of the torque converter 14, i.e., the input shaft rotation speed of the transmission, and a transmission output shaft rotation sensor 17 for detecting the rotation speed of the transmission output shaft.

The ECU 8 receives information from a crank angle sensor 21, the air flow sensor 10 and a throttle sensor 18, and executes calculations of signals such as an engine rotation speed signal. The ECU 8 performs a variety of controls, which include a fuel control by outputting a valve opening drive signal to the injector 13, an assist air flow control by outputting a valve opening drive signal to an idle speed control valve ISC 19 and, though not shown, an ignition timing control by outputting an ignition signal to an ignition spark plug. The ATCU 7 receives signals from the transmission output shaft rotation sensor 17 and an AT fluid temperature sensor 22, and also receives the engine rotation speed and throttle valve opening signals from the ECU 8. Using these signals, the ATCU 7 performs calculations, and outputs a valve opening drive signal for driving the open of a hydraulic control switch solenoid valve 20 provided in a hydraulic control circuit, a drive signal for driving the ISC 19, and an ignition timing correction signal.

Figure 2:
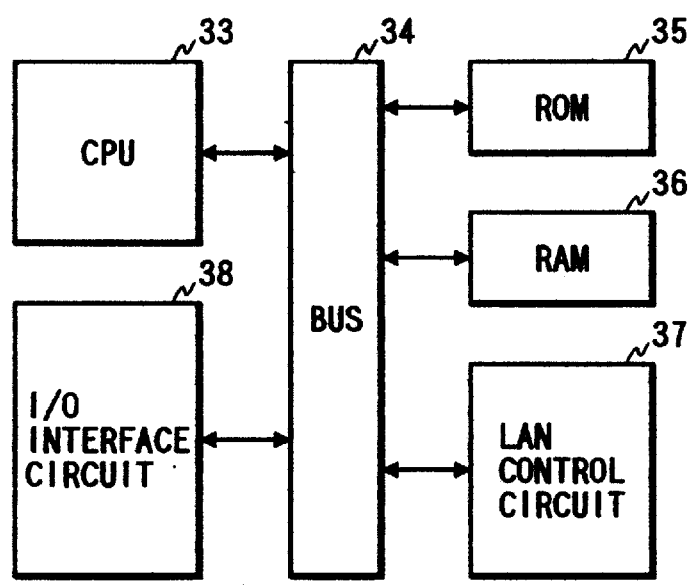
FIG. 2 is a block diagram showing an example of the configuration of a control device such as ATCU or ECU used in this invention.

An example of the configuration of a control device such as the ATCU or ECU mentioned above is shown in FIG. 2. The control device comprises at least a CPU 33, a ROM 35, a RAM 36, an I/O interface circuit 38, and a bus 34 interconnecting these. When the ATCU 7 and ECU 8 are connected through a LAN, a LAN control circuit 37 is required, as shown in FIG. 1.

According to this invention, similar effects can be produced in the control device of a type in which a single CPU having the functions of the ATCU and ECU by integrating them.

FIG. 4 is a time chart that explains a method of a first embodiment of this invention, of reducing the upshift shock. The gear shift changing control is started by a shift changing command. The estimated turbine torque is found at predetermined time intervals irrespective of the gear shift changing command. The method of estimating the turbine torque will be described later. Though not shown, when a gear shift changing command is issued, the hydraulic switch solenoid valve 20 for the gear position is activated, engagement of the engagement friction elements such as a clutch and a brake for the gear position. Thus, the gear for the gear position begins to be engaged. When the gear starts to be engaged, the estimated turbine torque increases almost stepwise as shown. This is because the upshift causes the engine rotation speed and the turbine rotation speed to fall quickly and the inertia components of the engine and so are added.

In this invention, the rising point of the estimated turbine torque is detected and recognized with a slice level St, and the time t2 is used for a stepwise switch point of gear ratio, that is used for the estimated output shaft torque calculation, and for a generation point of the targeted torque pattern. Like the estimated turbine torque, the estimated output shaft torque is also calculated at predetermined intervals irrespective of the shift command. The estimated output shaft torque is the output shaft torque of the transmission calculated by multiplying the estimated turbine torque by the gear ratio at that time. When information on the time t2 is received, the gear ratio to be used for the above calculation is switched stepwise from the gear ratio before the gear shift changing command to the gear ratio after the command. This is because the rising point of the estimated turbine torque is the starting point of switching from the gear before the shift command to the gear after the shift command, and also a switch point of the torque transmission path.

This stepwise switching of the gear ratio causes the estimated output shaft torque to decrease stepwise at time t2, after which it increases in accordance with the waveform proportional to the rising waveform of the estimated turbine torque (see torque waveforms A, B, C shown).

When the gear engagement is completed, the estimated turbine torque returns to the predetermined low value, as shown. The period during which the estimated turbine torque is high on the upper base of a trapezoidal shape of the waveform is an actual gear engagement period, in which the engine rotation speed and the turbine rotation speed are sharply reduced. In this period, the inertia component of the torque is released and hence the estimated turbine torque is large on the upper base of a trapezoidal shape. This period is called an inertia phase. Therefore, the estimated output shaft torque exhibits a waveform proportional to the estimated turbine torque waveform, allowing the torque during the gear shift changing to be estimated with fidelity. A person on the vehicle senses the change with time of the estimated output shaft torque and feels it as a shift shock. To reduce the shift shocks, it is necessary to minimize the change with time of the estimated output shaft torque (torque fluctuation in the inertia phase). This invention accomplishes this requirement in the following manner. At time t2, an average Tob of the estimated output shaft torque immediately before the gear shift changing is calculated. The estimated output shaft torque is calculated at predetermined time intervals (10 ms, for example) and stored successively in a RAM. In this case, an arbitrary number of estimated values (say, 14 values) are stored. When the latest estimated value is stored, the previously stored estimated values are shifted to the next memory locations, with the oldest value discarded. Hence, at time t2 all or a part of the stored estimated values are read out to calculate the average value Tob of the estimated output shaft torque immediately before the gear shift changing. Next, an output shaft torque Toa immediately after the gear shift changing is calculated using the formula Toa=(Tob/gear ratio before gear shift changing)×(gear ratio after gear shift changing). From the difference between these torques, the output shaft torque difference ΔTo between the torques before and after the gear shift changing is determined. A temporal inclination angle θt of the targeted torque pattern during gear shift changing is determined from a preset targeted gear shift changing period Δtus and the torque difference ΔTo. The targeted torque is calculated at predetermined intervals by using the temporal inclination angle θt from the time t0, as shown. As a result, the targeted torque pattern has an inclined characteristic during the gear shift changing, as shown. In this targeted torque pattern generation period, the deviation δ between the estimated output shaft torque To calculated at predetermined intervals and the target torque is determined. The engine ignition timing is corrected so that this deviation δ is rendered zero, in order to control the engine output torque. The deviation δ is determined using the formula of (estimated output shaft torque To)−(targeted torque)= deviation δ. When δ is positive, the firing timing is retarded; when δ is negative, the firing timing is advanced. In the example of FIG. 4, however, when δ is negative during a predetermined period (for example, 50 ms) from the time t2, the firing timing is not advanced, and when δ becomes positive, the firing timing is retarded. This is because an attempt to correct the drop of the torque at the initial stage of gear shift changing may increase the amount of advance of the ignition timing into the region where knocking occurs. If this influence can be ignored, the above method of FIG. 4 need not be used.

The ignition timing correction value Δθig is calculated by multiplying the deviation δ by a specified conversion coefficient kc, i.e., Δθig=kc×δ.

Figure 5:
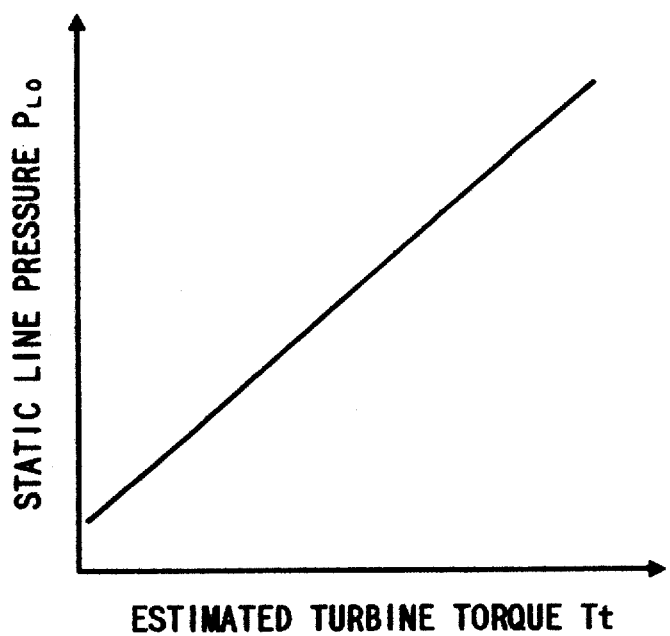
FIG. 5 is a graph showing a static line pressure characteristic used in this invention.
Figure 6:
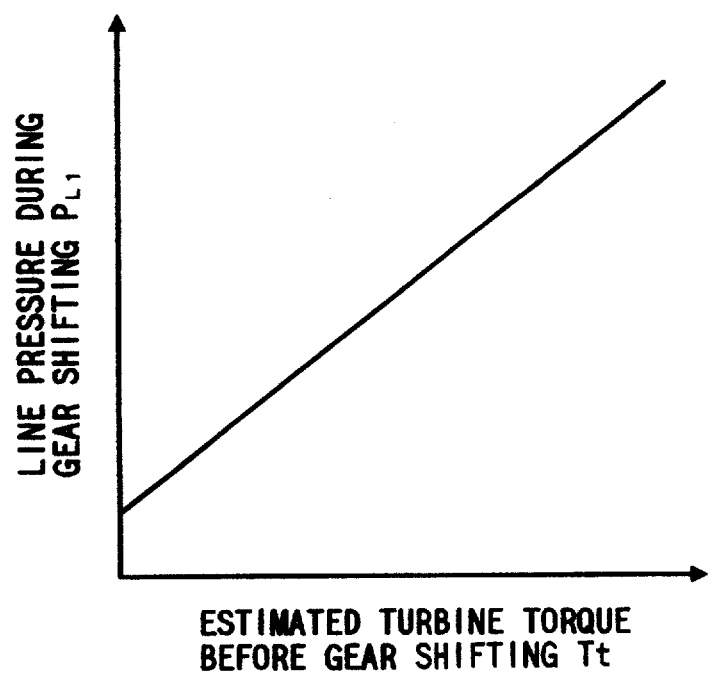
FIG. 6 is a graph showing the characteristic of line pressure at gear shift changing.

Next, a method of controlling the line pressure will be described. The static line pressure PL0 before a shift command is issued is either formulated as a linear function of the estimated turbine torque Tt as shown in FIG. 5 and stored, or mapped and stored in memory. The PL0 is derived from an average of a specified number of estimated turbine torques Tt, and the control is performed. It is ideal that the static line pressure PL0 is determined and controlled in this way after the shift command until the time t2. Considering the waste time of hydraulic pressure acting on the clutch with respect to the step response of the line pressure control solenoid, the primary delay characteristic, the line pressure during gear shift changing is set to PL1 at time tL a predetermined time t2 before this. The line pressure PL1 during gear shift changing is either formulated as a linear function of the estimated turbine torque Tt (Tt in a period t0–t1) as shown in FIG. 6 and the function is stored in a memory or mapped or the map is stored in a memory. The PL1 is derived from an average of a specified number of estimated turbine torques Tt and then controlled. When the function of the line pressure stored, a portion corresponding to the inclination of FIG. 6 is stored as a constant in a RAM. The line pressure PL1 during gear shift changing is generally set to a value a predetermined amount smaller than the static line pressure PL0. Reducing the line pressure PL1 at gear shift changing results in a reduction in the output shaft torque in inertia phase. This is because the reduction in the hydraulic pressure applied to the clutch in the inertia phase prolong the clutch engagement time, causing the engine rotation speed to slowly change to the lower speed side and thereby reducing the amount of the inertia component torque released per unit time. Hence, as the line pressure PL1 at gear shift changing is made smaller, the time Δtus required for gear shift changing becomes longer in proportion to that. Although in the time chart of FIG. 4 the time of the inertia phase is constant regardless of the magnitude of the line pressure PL1 at gear shift changing, the actual time of inertia phase changes as mentioned above. For simplicity of explanation, in FIG. 4, the time is being constant.

Detailed explanations will be given to essential parts of this invention. In FIG. 4, the ignition timing correction value Δθig is subjected to retard limit at a predetermined value so that the ignition timing is not retarded any further. This is because retarding the ignition timing until the estimated output shaft torque To comes into the target torque pattern will cause the timing to enter a region where the combustion in engine is hindered very badly. From the middle of the inertia phase onward, therefore, the characteristic of the estimated output shaft torque To gradually deviates from the target torque pattern. Hence, the estimated output shaft torque To during the inertia phase may exhibit a variety of waveforms designated by A, B, C in FIG. 4. Other possible factors responsible for different waveforms include 1) variation of generated torque among engines, 2) change with time of the generated engine torque, 3) variation of clutch engagement force with respect to the AT hydraulic pressure, and 4) change with time of the clutch engagement force with respect to the AT hydraulic pressure. This invention copes with these problems and makes improvements as follows.

In the period of Δt seconds from the time t2, i.e., a target torque pattern starting point, the estimated output shaft torque To is compared with an upper limit LV1 and a lower limit LV2 that are preset and stored beforehand. When the estimated output shaft torque To is between the upper and lower limits LV1, LV2, as in the case of waveform A, the line pressure holds the current value till the next time. When the estimated output shaft torque To is greater than the upper limit LV1, as in the case of waveform B, a value B of the line pressure smaller than the current value A by a given value is stored in a RAM to be read out next time. When the estimated output shaft torque To is smaller than the lower limit LV2, as in the case of waveform C, a value C of the line pressure larger than the current value A by a given value is stored in a RAM to be read out next time. With such a learning control introduced, it is possible to control and confine the estimated output shaft torque To during the inertia phase within a specified range at all times irrespective of the above-mentioned machine variation and change with time, thus maintaining the performance of gear shift changing at a high level.

There are a variety of methods for comparison of the estimated output shaft torque To with the upper and lower limits LV1, LV2 and for judgment thereof. One example of the methods will be explained below referring to FIG. 7. Let us consider two cases: one in which the estimated output shaft torque To exceeds the upper limit LV1 intermittently, as shown by the waveform B'; and one in which the estimated output shaft torque To exceeds the lower limit LV2 intermittently, as shown by the waveform C'. When To exceeds LV1 as in the first case, the S1 counter starts adding up the excess amount. Although this counting operation continues until time t3, the integrated value or the S1 counter value is already saturated at time tc before t3. Hence, in the period between tc and t3, the counter value S1 is read and stored in a RAM. Then, comparison is made between the counter value S1 and a first excess judgment value SL1, which is preset and stored beforehand. When SI is found greater than SL1, the following operation, as explained in FIG. 4, is performed. The line pressure PL1 at gear shift changing is reduced by a predetermined value APL from the current value PL1=PL1 (current value)−ΔAPL and stored in a RAM. The control of the next time is performed using the corrected line pressure PL1 at gear shift changing.

When, on the other hand, To exceeds LV2 but not LV1, as in the latter case, the counter integrated value S2 of the S2 counter is read out during the period from tc to t3 and stored in a RAM. Then, the value S2 is compared with a second excess judgment value SL2 that is preset and stored beforehand. When S2 is found greater than SL2, it is judged that the line pressure PL1 at gear shift change of current value is used this time was appropriate and no correction is made. When S2 is found smaller than SL2, the line pressure PL1 at gear shift changing is increased by a predetermined value APL from the current value PL1=PL1 (current value)+APL and stored in a RAM. The control of the next time is performed using the corrected line pressure PL1 at gear shift changing.

Next, a method of estimating the torque is explained. Torque estimation methods are largely classified into two types: one that estimates the torque from the engine characteristic and one that estimates the torque from the torque converter characteristic. Torque estimation based on the engine characteristic is realized by any of the following methods.

(1) A method of estimating the engine torque from the engine rotation speed Ne and the throttle valve opening TVO.

(2) A method of estimating the engine torque from the engine rotation speed Ne and the air mass flow Qa.

(3) A method of estimating the engine torque from the engine rotation speed Ne and the intake air pressure and intake air temperature.

(4) A method of estimating the engine torque from the engine rotation speed Ne and the injector pulse width.

Figure 8:
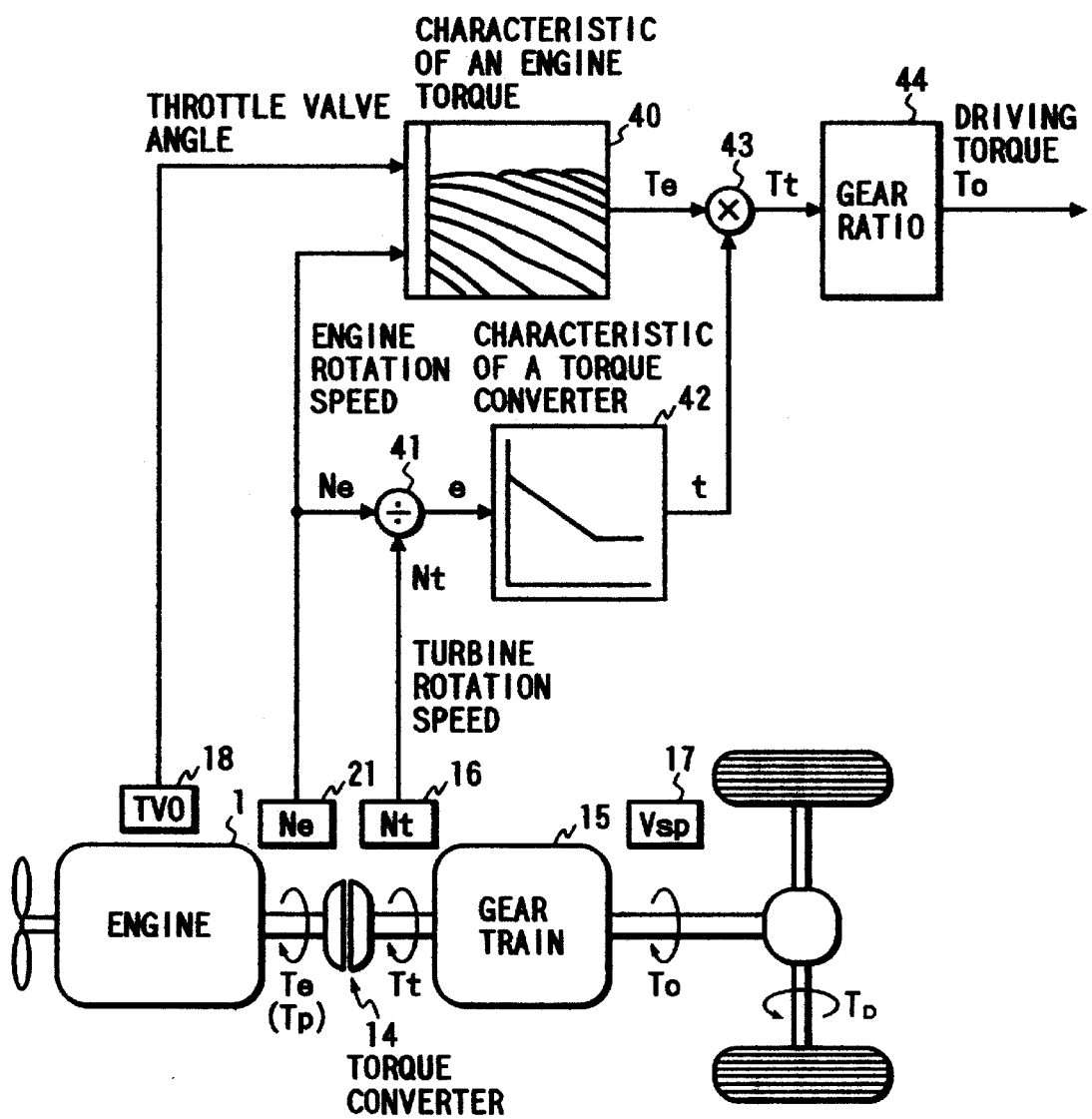
FIG. 8 is a block diagram showing an example of a method for estimating the driving torque from the engine characteristic according to this invention.

The engine torque estimation method of (1) that estimates the torque from the engine rotation speed Ne and the throttle valve opening TVO will be described referring to FIG. 8. The engine torque Te is read from the map that is stored in a ROM beforehand. This map contains the engine torque Te stored for every specified magnitude and correlated with Ne and TVO. A block 40 receives the throttle valve opening TVO from the throttle valve opening sensor and the engine rotation speed Ne from the crank angle sensor 21 (Ne may be supplied through ECU), searches through the map and performs interpolation calculation to determine the engine torque Te at that time. A block 41 executes the computation of e=Nt/Ne, where Nt is the output rotation speed of the torque converter and commonly called a turbine rotation speed, to determine the slip ratio e of the torque converter. The turbine rotation speed may be determined either by directly detecting it by means of the turbine rotation speed sensor 16 or by indirectly determining it by dividing the vehicle speed Vsp by the gear ratio at that time. A block 42 searches through the characteristic map of the torque ratio t in connection with e and performs interpolation calculation to find the corresponding torque ratio t of the torque converter (=(torque converter output torque Tt)/(torque converter input torque Te)). A block 43 calculates the formula of Tt=Text to determine the output torque Tt of the torque converter, i.e., the turbine torque Tt. A block 44 multiplies the turbine torque Tt by the gear ratio at that time to determine the output shaft torque To of the transmission.

Figure 9:
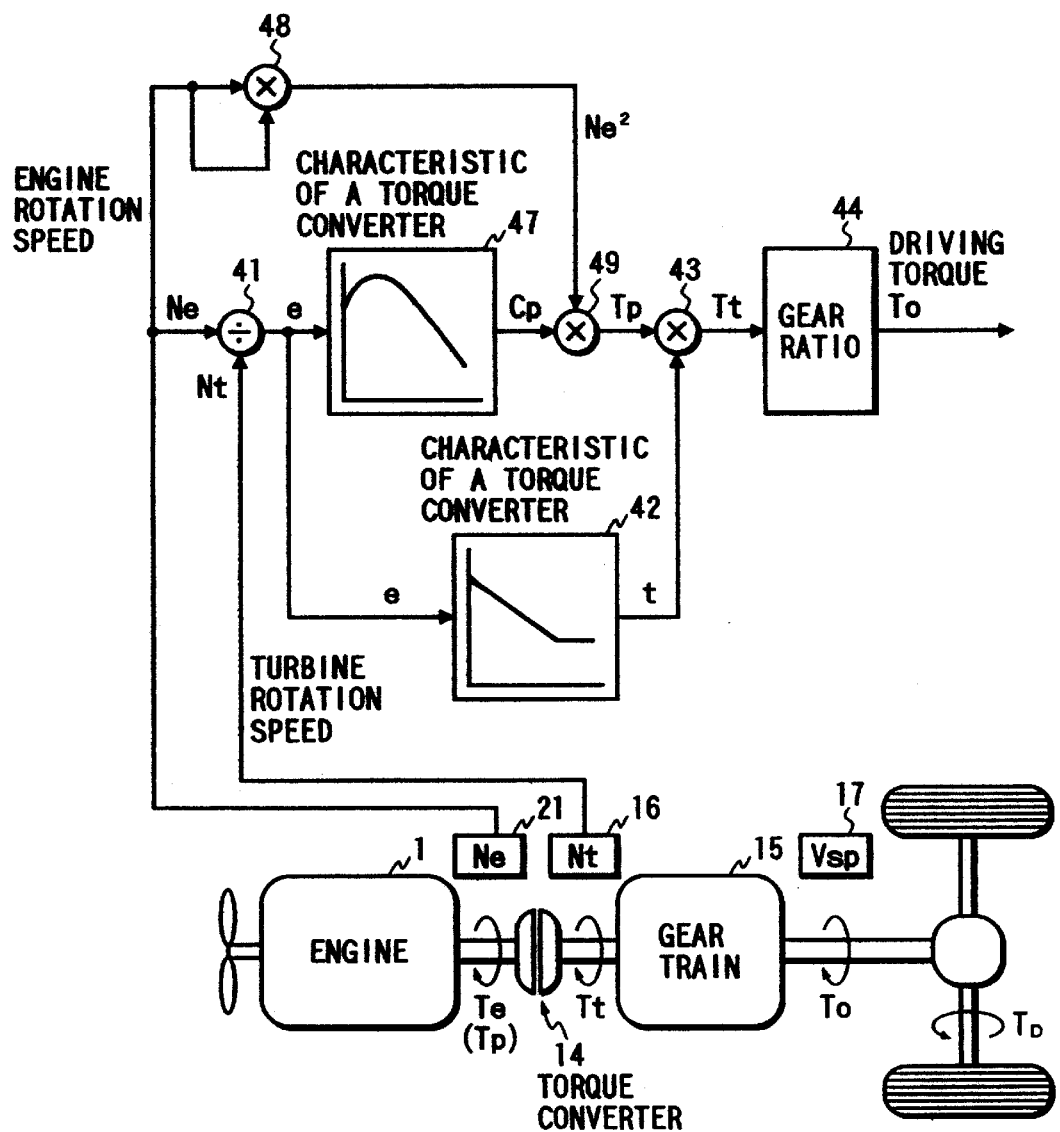
FIG. 9 is a block diagram showing a method for estimating the driving torque from the torque converter characteristic according to this invention.

Next, a method of estimating the torque from the torque converter characteristic will be explained referring to FIG. 9. A block 41 receives the engine rotation speed Ne from the crank angle sensor 21 (Ne may be supplied through the ECU) and performs calculation of e=Nt/Ne, where Nt is the output rotation speed of the torque converter and commonly called a turbine rotation speed, to determine the slip ratio e of the torque converter. This turbine rotation speed may be determined either by directly detecting it by means of the turbine rotation speed sensor or by indirectly determining it by dividing the vehicle speed Vsp by the gear ratio at that time. A block 47 takes in the slip ratio e, searches through the characteristic map, stored in a ROM beforehand, of the slip ratio e and the torque converter input capacity coefficient Cp and performs interpolation calculation to find the Cp value at that time. A block 48 calculates Ne2 and a block 49 performs calculation of Tp=Cp×Ne2 to determine the input torque Tp (=Te) of the torque converter. The subsequent routine is the same as that shown in FIG. 8 and its explanation will be omitted.

Figure 10:
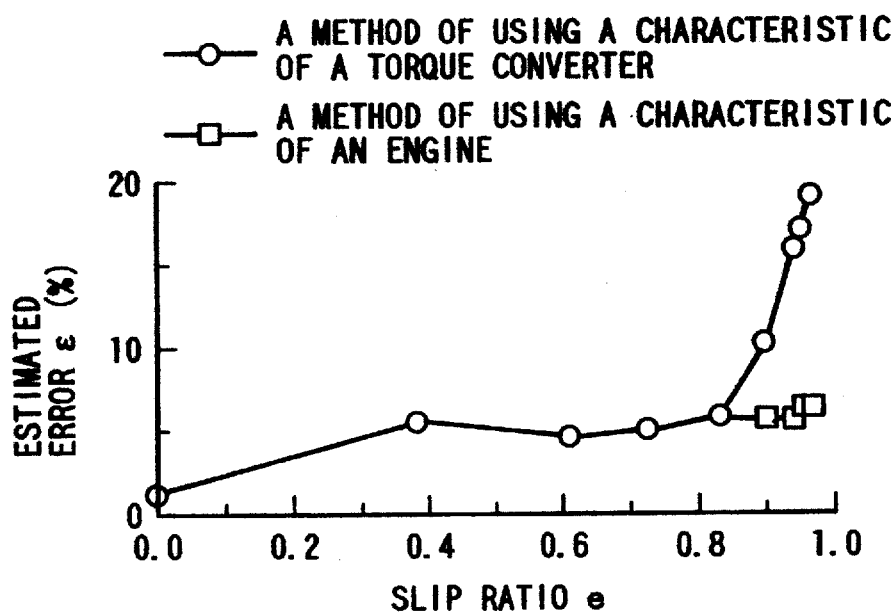
FIG. 10 is an error characteristic diagram of the method of estimating the driving torque based on the converter characteristic and engine characteristic according to this invention.

As described above, the method of estimating the output shaft torque, i.e., the driving torque, of the transmission is largely classified into the one that uses the engine characteristic and the one that uses the torque converter characteristic. It is desirable from the standpoint of estimation accuracy that the two methods be selectively used in appropriate regions. FIG. 10 shows an example of the characteristic. In the method that uses the torque converter characteristic, as the slip ratio e increases, the input capacity coefficient Cp rapidly approaches zero, in other words, the inclination of Cp with respect to e becomes sharp, increasing the estimation error. On the other hand, the method using the engine characteristic is a method for estimating the output torque of the engine, and cannot estimate the load torque components of accessory devices, such as air conditioner, power steering oil pump and head lamps. This second method therefore involves an estimation error corresponding to the load torque component of the accessory devices. In region where the load torque of the accessory devices is relatively large compared with the output torque of the engine, i.e., in the low-speed and light-load operation region, the estimation error is large. Hence, the two methods are selectively used according to the magnitude of the slip ratio e. That is, when $e \leq A$ where A is boundary value of the slip ratio e between the two regions, the method using the torque converter characteristic is used; and when $e > A$, the method using the engine characteristic is adopted.

Figure 11:
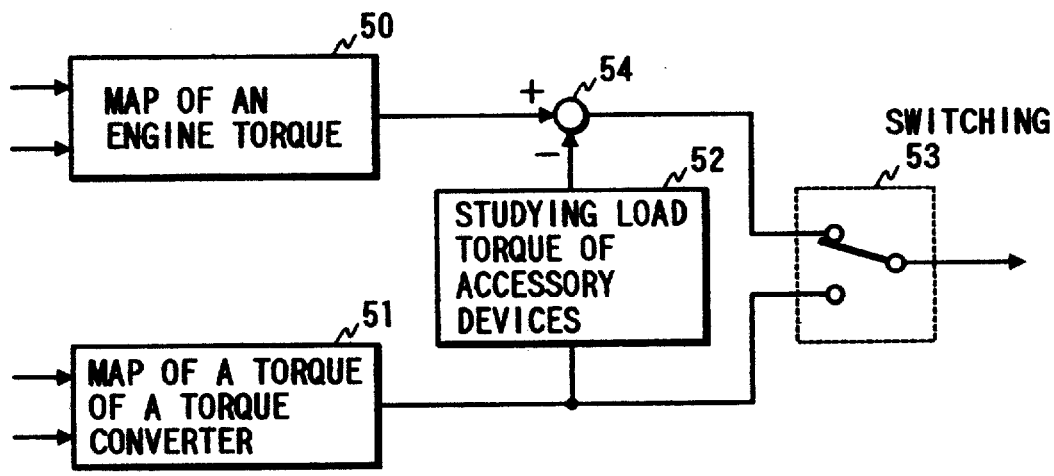
FIG. 11 is a block diagram showing the switching the driving torque estimation method based on the torque converter characteristic and the engine characteristic according to this invention.

FIG. 11 is a block diagram showing the method of learning the above-mentioned load torque component of accessory devices. A block 50 calculates the output torque Te of the engine by the method using the engine characteristic, and a block 51 calculates the input torque Tp of the torque converter by the method using the torque converter characteristic. A block 53 is a selector for selecting a method from the two methods according to the magnitude of the slip ratio e. A block 52, when $e \leq A$, executes calculation of Tacc=Tp−Te at all times to determine the load torque Tacc of accessory devices, stores in a RAM the average of a specified number of calculated load torques, and updates the stored average for every predetermined number of calculations. When $e > A$ and the method using the engine characteristic for calculating the engine output torque Te is selectively used, the latest accessory devices load torque Tacc learned and stored in the block 52 is added to the engine output torque Te to calculate the torque converter input torque Tp and to use it for the driving torque estimation.

FIG. 12 is a time chart showing the method of reducing shocks at up-shift, of a second embodiment of this invention. This shock reducing method is similar to the one of FIG. 4, except that the temporary inclination angle θt of the targeted torque pattern differs from the angle of FIG. 4. In such a way, the value θt can be adequately determined. Because this method is basically similar to FIG. 4, detailed explanation will be omitted.

FIG. 13 shows a third embodiment of this invention. This is a time chart showing the method of reducing shocks at up-shift, as in the case of FIG. 4. Only the points that differ from those of FIG. 4 will be explained below.

The ignition timing correction value Δθig is calculated by multiplying the deviation δ thus determined by a specified conversion coefficient kc, $$\Delta\theta ig = kc \times \delta$$

This calculation is performed in the time range between t0 and t2. In the time range between t2 and t3, the ignition timing correction value Δθig is calculated as follows to smoothly end the torque feedback control performed in the above-mentioned way.

$$\Delta\theta ig = (kc/N) \times \delta$$

where N is the number of times that the ignition timing correction value Δθig is calculated at a predetermined calculation cycle after time t2 or a monotonously increasing function of time, and N takes a value of 1 or larger. The conversion coefficient kc or kc/N is a sort of feedback control gain, which is constant during the period between t0 and t2 and is decreased with time during the period between t2 and t3. The time t2 is the timing at which to change the control gain, and the time t3 is the timing at which to stop the ignition control and to restore the line pressure.

Next, a method of controlling the line pressure will be described. For the static line pressure before a shift command, a first line pressure PL1 is during gear shift changing is determined from the estimated turbine torque immediately after the shift command; at time t1, a second line pressure PL2 during gear shifting is determined so that it is smaller than the first line pressure PL1 by a specified ratio; and at time t3, the line pressure is returned to the static line pressure PL0' after gear shifting. If there is a possibility that, if the line pressure is set to the first line pressure PL1 during gear shift changing immediately after the shift command, the gear engagement start timing (t0 shown in the figure may be delayed), it is possible to use the static line pressure PL0 up to time t0 or slightly before it, and thereafter set the line pressure to the first line pressure PL1 at gear shift changing.

By performing the above-mentioned control, the estimated output shaft torque To is expressed by a waveform that almost follows up the target torque pattern, as indicated by a dashed line in FIG. 13, greatly reducing the shift shock.

Figures 14, 15:
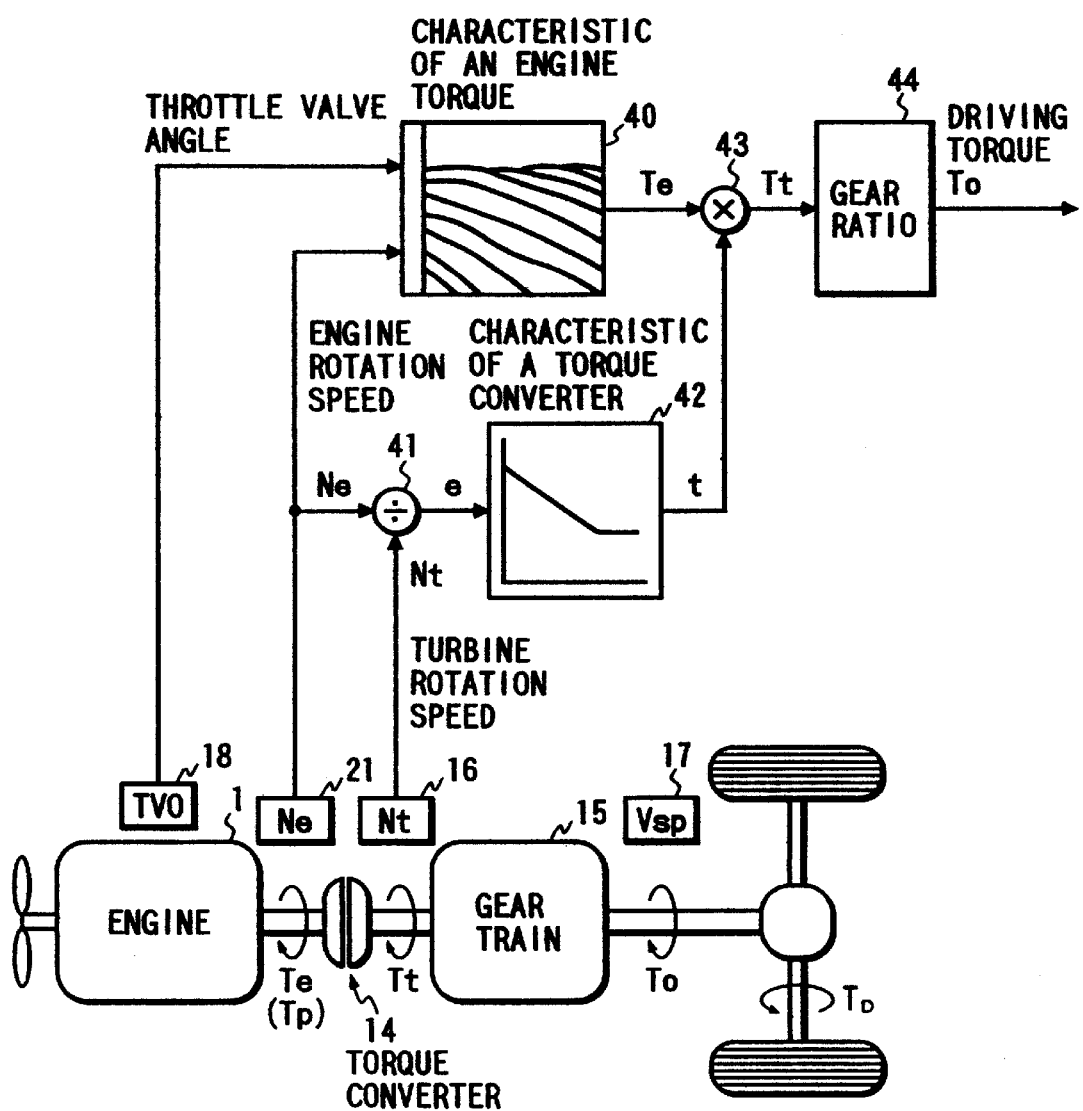
FIG. 14 is an example of a timer table.
FIG. 15 is a block diagram showing a first method of estimating the driving torque from the engine characteristic.

The timer values Δtus, t1, t2, t3 used in FIG. 13 are stored in a table as control constants for each kind of gear shift changing, as shown in FIG. 14, and read out as required. There is no need to use all the timer values shown above. For example, t1 and t2 may not be used. Instead, variables such as the ratio between the input rotation speed (called a turbine rotation speed) and the output rotation speed (vehicle speed signal) of the transmission, i.e., the input/output rotation speed ratio, or the ratio between the engine rotation speed and (vehicle speed×gear ratio after gear shift changing), i.e., the pseudo torque converter slip ratio may be used, and the operation that is performed at t1 and t2 may be executed when this ratio reaches a specified value. The use of the above rotation information often allows the control timing to be determined more precisely.

The method of torque estimation will be detailed below. This method may be classified largely into a method that estimates the torque from the engine characteristic and a method that estimates it from the torque converter characteristic. The torque estimation based on the engine characteristic may be realized by any of the following methods.

(1) A method of estimating the engine torque from the engine rotation speed Ne and the throttle valve opening TVO.

(2) A method of estimating the engine torque from the engine rotation speed Ne and the air mass flow Qa.

(3) A method of estimating the engine torque from the engine rotation speed Ne and the intake air pressure and intake air temperature.

(4) A method of estimating the engine torque from the engine rotation speed Ne and the injector pulse width.

FIG. 15 is a control block diagram showing how the engine torque is estimated from the engine rotation speed Ne and the throttle valve opening valve TVO. The engine torque Te is read from the map that is stored in a ROM beforehand. This map contains the engine torque Te stored for every specified magnitude and correlated with Ne and TVO. A block 40 receives the throttle valve opening TVO from the throttle valve opening sensor and the engine rotation speed Ne from the crank angle sensor (Ne may be supplied through ECU), searches through the map and performs interpolation calculation to determine the engine torque Te at that time. A block 41 executes the computation of e=Nt/Ne, where Nt is the output rotation speed of the torque converter and commonly called a turbine rotation speed, to determine the slip ratio e of the torque converter. The turbine rotation speed may be determined either by directly detecting it from the turbine rotation speed sensor or by indirectly determining it by multiplying the vehicle speed Vsp by the gear ratio at that time. The block 42 searches through the characteristic map of the torque ratio t corresponding to e and performs interpolation calculation to find the torque ratio t of the torque converter (=(torque converter output torque Tt)/ (torque converter input torque Te)). A block 43, using the formula of Tt=T·et, determines the output torque Tt of the torque converter, i.e., turbine torque Tt. A block 44 multiplies the turbine torque Tt by the gear ratio at that time to determine the output shaft torque To of the transmission.

Figure 16:
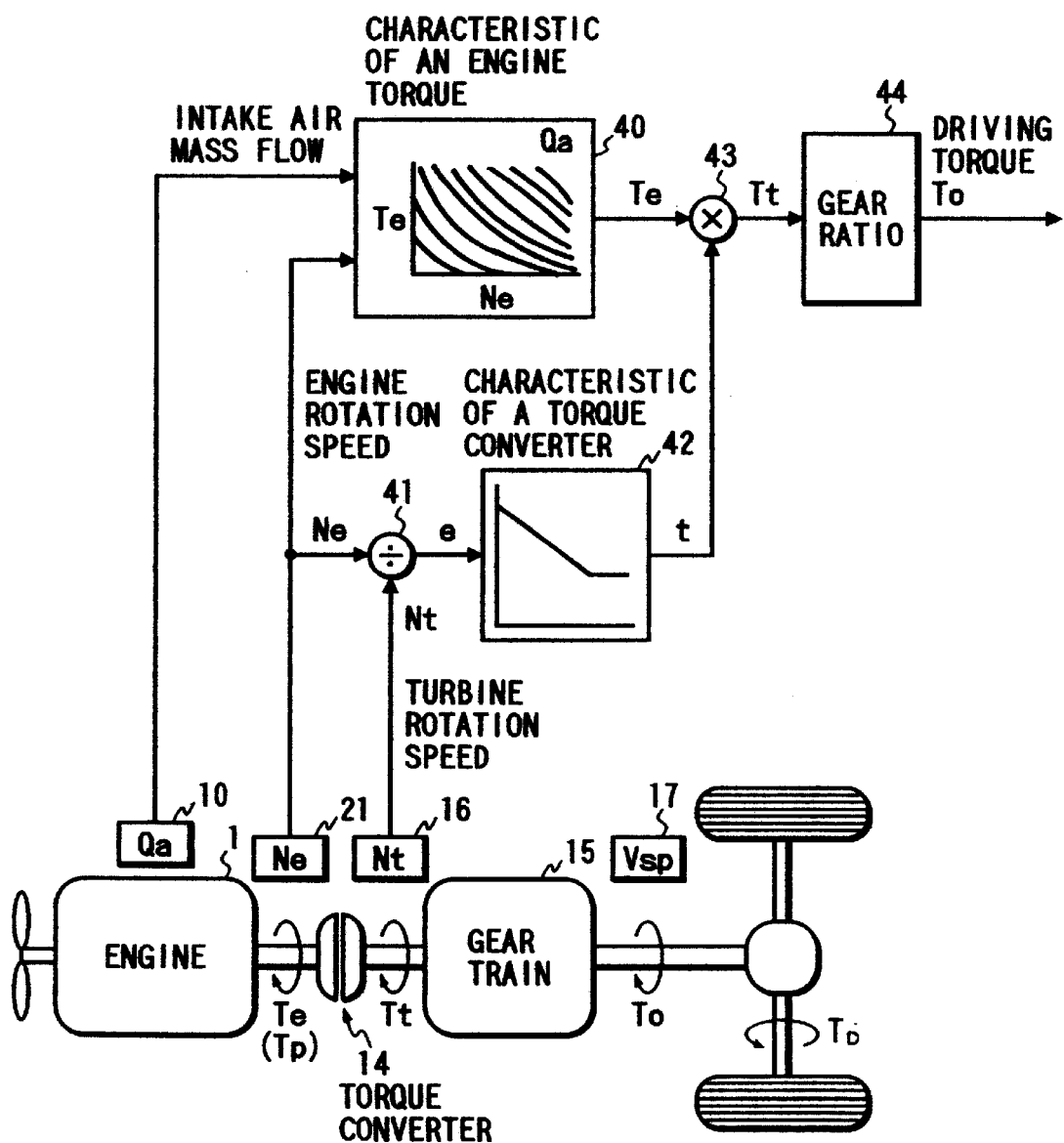
FIG. 16 is a block diagram showing a second method of estimating the driving torque from the engine characteristic.

FIG. 16 is a control block diagram showing how the engine torque is estimated from the engine rotation speed Ne and the air mass flow Qa. What differs from the method shown in FIG. 15 is that the air mass flow Qa is used instead of TVO. By the method of FIG. 15, estimation of the engine torque with high precision is difficult in environments in which the density of ambient air changes excessively, as at high altitudes and high and low temperatures. When high precision control is considered to be essential in such environments, the method of FIG. 16 is desirable.

Figure 17:
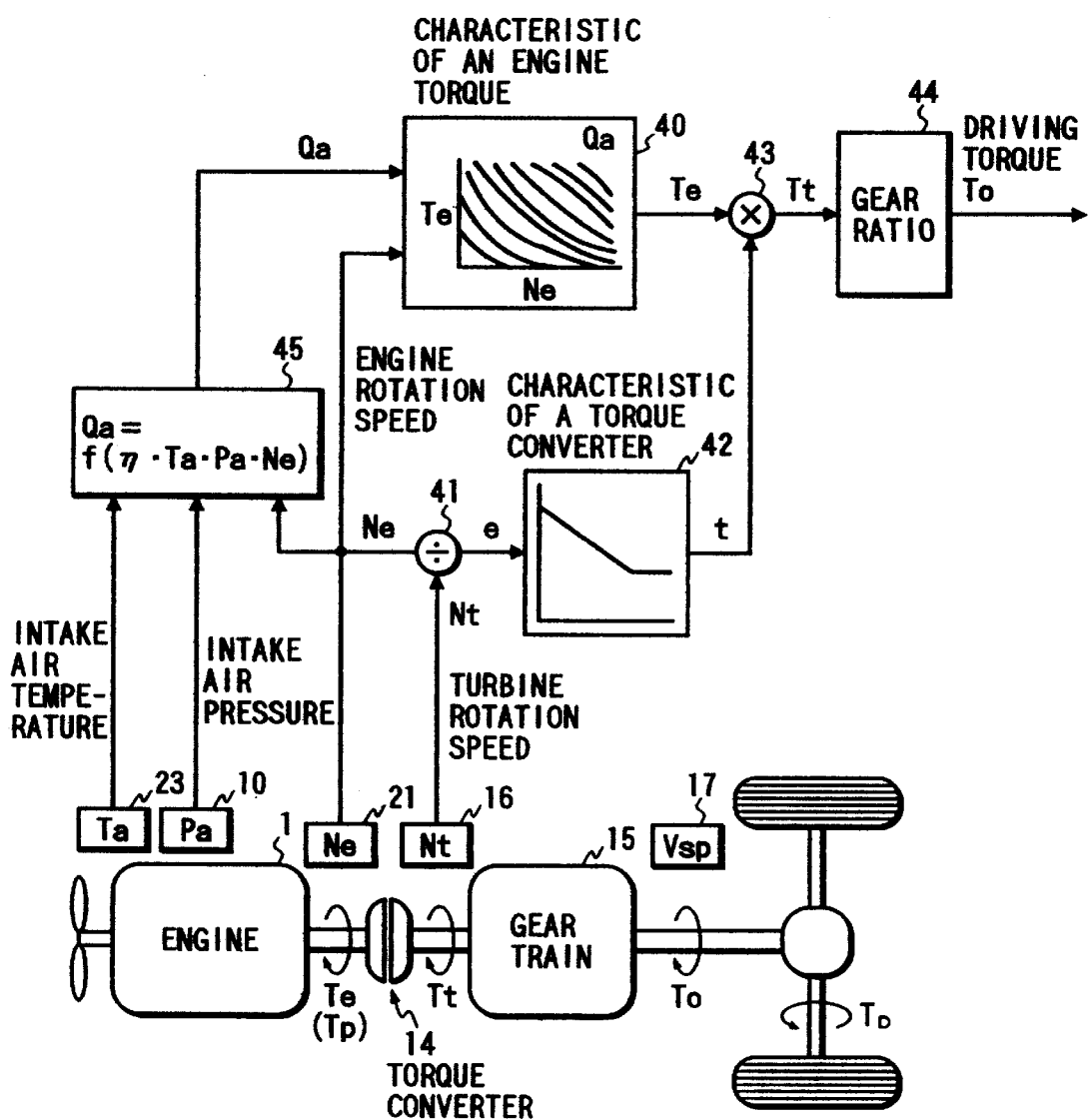
FIG. 17 is a block diagram showing a third method of estimating the driving torque from the engine characteristic.

FIG. 17 is a control block diagram showing the method of estimating the engine torque from the engine rotation speed Ne and the intake air pressure and temperature. What differs from the method of FIG. 16 is that the intake air pressure and temperature are used as sensor information instead of the air mass flow Qa. The sensor information is supplied to the block 45 to calculate the air mass flow Qa. In the case of a four-cycle four-cylinder engine, the block 45 determines the air mass flow Qa according to the following formula.

$$Qa=[(Ne/60)Vc\cdot\eta\cdot Pa]/(2\cdot R\cdot Ta)$$

where R is the gas constant, Ta is the intake air temperature, Pa is the intake air pressure, Vc is the engine displacement, and η is the charging efficiency. This method is expected to produce the similar effects to those of the method shown in FIG. 16.

Alternatively, the intake air pressure Pa may be used instead of the air mass flow Qa and the engine torque map may be searched by using the intake air pressure Pa and the engine rotation speed Ne. In this case, the block 45 is omitted; a map is prepared which contains Te stored for every predetermined magnitude and correlated with Ne and Pa; the map is searched by using the intake air pressure Pa detected by the sensor and the engine rotation speed Ne, and interpolation calculation is performed to determine the engine torque Te; and then the output shaft torque To of the transmission is determined in a similar way to the one described above.

Figure 18:
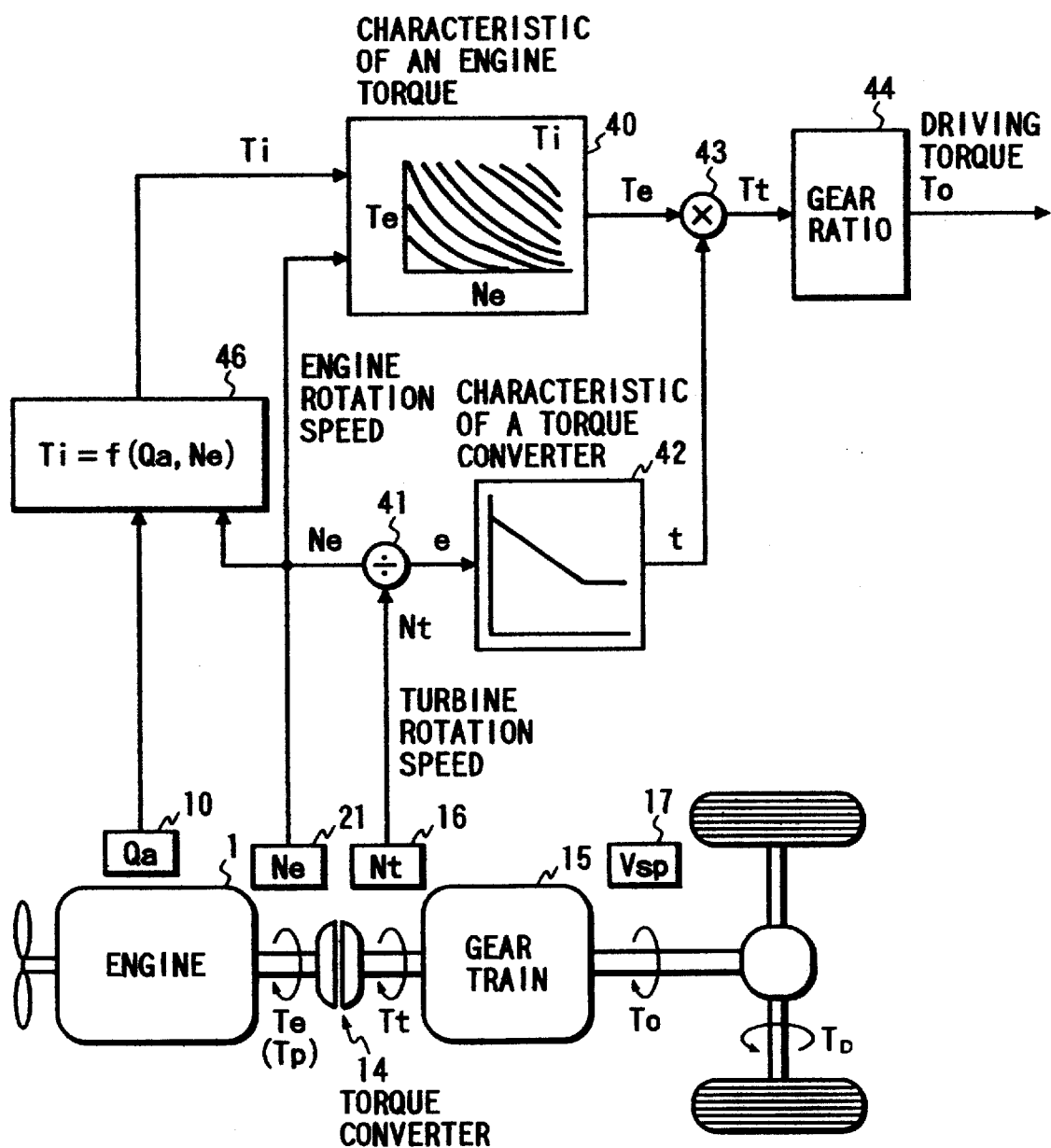
FIG. 18 is a block diagram showing a fourth method of estimating the driving torque from the engine characteristic.

FIG. 18 is a control block diagram showing the method of estimating the engine torque from the engine rotation speed Ne and the injector pulse width Ti. What differs from the method shown in FIG. 15 is that the injector pulse width Ti is used instead of TVO. A block 46 determines the injector pulse width Ti from the engine state information such as Ne and Qa (a part of the engine control routine) and calculates Te from Ti and Ne. A block 46 calculates Ti according to the following formula.

$$Ti=Qa\cdot K/Ne+Ts$$

where K is a constant and Ts is the injector response delay. The first term of the above formula calculated from Qa and Te corresponds to the effective pulse width.

The advantage of this method is that the engine torque can be estimated with high fidelity even when the ratio A/F of air-fuel mixture supplied to the engine changes depending on the parameters such as cooling water temperature and throttle valve opening in addition to Qa and Ne. This method is particularly useful even at times of low-temperature start warm-up, sharp acceleration output mixture, and switching between lean burn and rich burn. Ti may also be a value from ECU.

Figure 19:
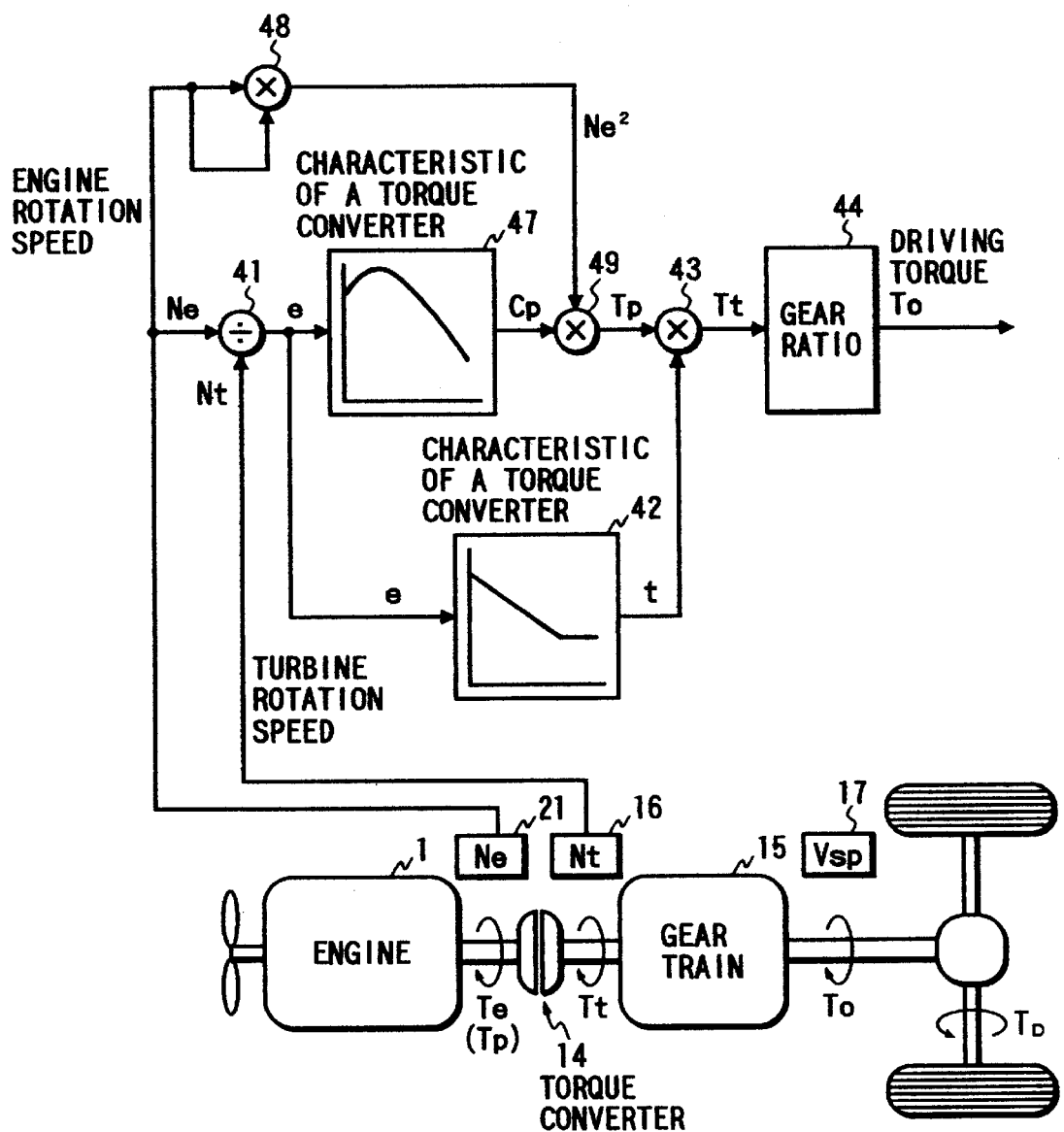
FIG. 19 is a block diagram showing a method of estimating the driving torque from the torque converter characteristic.

Next, the method of estimating the torque from the torque converter characteristic will be described referring to FIG. 19. A block 41 receives Ne from the crank angle sensor (Ne may be supplied through ECU) and performs calculation of e=Nt/Ne, where Nt is the output rotation speed of the torque converter and commonly called a turbine rotation speed, to determine the slip ratio e of the torque converter. The turbine rotation speed may be determined either by directly detecting it from the turbine rotation speed sensor or by indirectly determining it by multiplying the vehicle speed Vsp by the gear ratio at that time. A block 47 takes in the slip ratio e, searches through the characteristic map, stored in ROM beforehand, of the slip ratio e and the torque converter pump capacity coefficient Cp and performs interpolation calculation to find the Cp value at that time. A block 48 calculates $Ne^2$ and a block 49 performs calculation of $Tp=Cp\times Ne^2$ to determine the input torque Tp (=Te) of the torque converter. The subsequent routine is the same as those shown in FIG. 15 to 18 and its explanation will be omitted.

Figure 20:
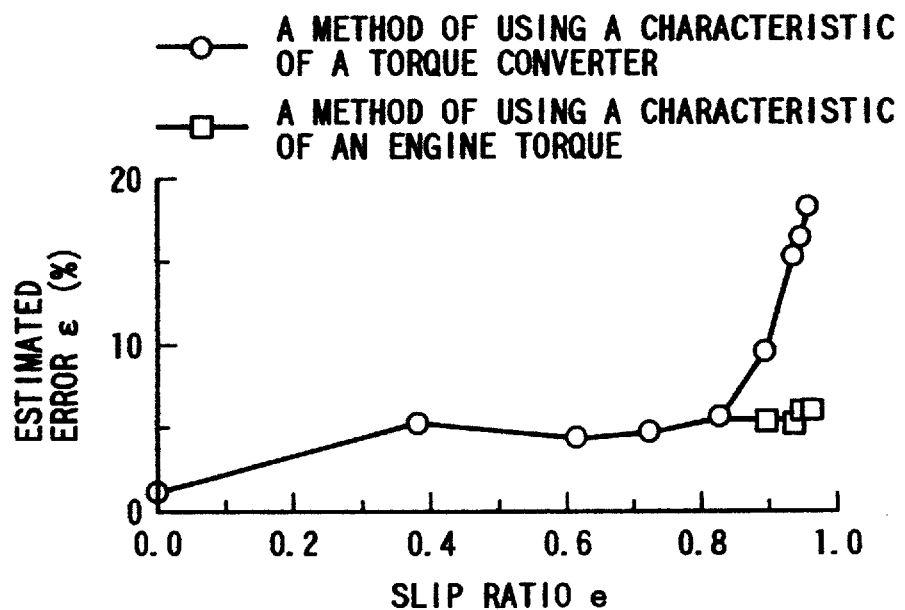
FIG. 20 is an error characteristic diagram showing the method of estimating the driving torque based on the torque converter characteristic and the engine characteristic.

As mentioned above, the method of estimating the output shaft torque of the transmission, i.e., the driving torque is classified largely into the method using the engine characteristic and the method using the torque converter characteristics. It is desirable from the standpoint of estimation precision that these methods be selectively used according to the operation region. FIG. 20 shows an example of the characteristic. In the method that uses the torque converter characteristic, as the slip ratio e increases, the input capacity coefficient Cp rapidly approaches zero, in other words, the inclination of Cp with respect to e becomes sharp, increasing the estimation error. On the other hand, the method using the engine characteristic is a method for estimating the output torque of the engine, and cannot estimate the load torque component of accessory devices, such as air conditioner, power steering oil pump and head lamps. This second method therefore produces an estimation error corresponding to the load torque components of the accessory devices. In the region where the load torque of the accessory devices is relatively large compared with the output torque of the engine, i.e., in the low-speed and light-load operation region, the estimation error is large. Therefore, the two methods are selectively used according to the magnitude of the slip ratio e. That is, when e≦A where A is the boundary value of the slip ratio between the two regions, the method using the torque converter characteristic is used; and when e>A, the method using the engine characteristic-based method is adopted.

Figure 21:
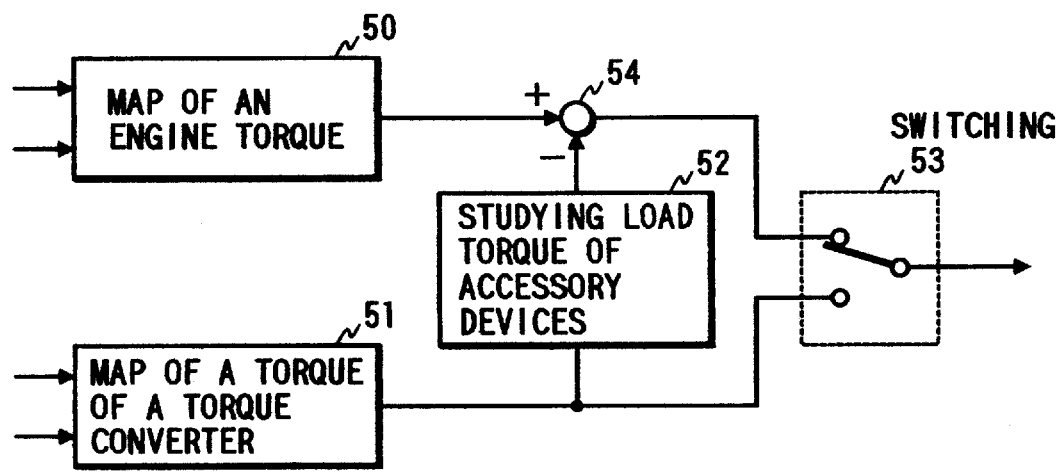
FIG. 21 is a block diagram showing the switching the methods of estimating the driving torque based on the torque converter characteristic and the engine characteristic.

FIG. 21 is a block diagram showing the method of learning the above-mentioned load torque components of accessory devices. A block 50 calculates the output torque Te of the engine by the method using the engine characteristic, and A block 51 calculates the input torque Tp of the torque converter by the method using the torque converter characteristic. A block 53 is a selector for selecting a suitable method from the two method according to the magnitude of the slip ratio e. A block 52, when e≦A, executes calculation of Tacc=Tp−Te at all times to determine the load torque Tacc of the accessory devices, stores in a RAM the average of a specified number of the calculated load torques, and updates the stored average for every predetermined times of calculations. When, for example, e>A and the selector selects the method using the engine characteristic to calculate the engine output torque Te, the latest accessory devices load torque Tacc learned by the block 52 and stored is subtracted from the engine output torque Te to calculate the torque converter input torque Tp for the driving torque estimation.

FIG. 22 is a detailed time chart showing the torque feedback control, of a fourth embodiment of this invention. This shows the control between times t0 and t3 in FIG. 13 in detail. In the following explanation, it is assumed that the estimated torque changes as shown in FIG. 22, in contrast to the target torque pattern generated at a certain inclination from time t0. Actually, the targeted torque value tTon and the engine torque value Ton are calculated in each calculation cycle $\Delta ts$ and used for the torque feedback control.

During the period in which the targeted torque pattern is generated, the deviation $\delta$ between the estimated output shaft torque Ton calculated at predetermined time intervals $\Delta ts$ and the targeted torque tTon is determined. The ignition timing is corrected in such a way as to make the deviation $\delta$ zero, thereby controlling the output torque of the engine. The deviation $\delta$ is determined as follows.

(estimated output shaft torque Ton)−(targeted torque tTon)=deviation 6

When $\delta$ is positive, the ignition timing is retarded and, when it is negative, the timing is advanced.

In the example of FIG. 22, however, when $\delta$ is negative during a predetermined period $\Delta Tx$ (for example, 50 ms) from the time t0, the ignition timing is not advanced; and when $\delta$ become positive, the ignition timing is retarded. This is because an attempt to correct the drop of the torque at the initial stage of gear shift changing may increase the amount of advance of the ignition timing to the region where knocking occurs. When this influence can be ignored, the above method need not be used.

The ignition timing correction value $\Delta \theta ig$ is calculated by multiplying the deviation $\delta$ by the predetermined conversion coefficient kc, i.e., $$\Delta \theta ig = kc \times \delta$$

This calculation is performed in the time range between t0 and t2. In the time range between t2 and t3, the ignition timing correction value $\Delta \theta ig$ is calculated as follows to smoothly end the torque feedback control performed in such a way.

$$\Delta \theta ig = (kc/N) \times \delta$$

where N is the number of times that the ignition timing correction value $\Delta \theta ig$ is calculated at a predetermined calculation cycle after time t2 or a monotonously increasing function of time, and N takes a value of 1 or larger. The conversion coefficient kc or kc/N is a sort of feedback control gain, which is constant during the period between t0 and t2 and is decreased with time during the period between t2 and t3.

At time $t0+\Delta ts$, $\delta_1=To_1-tTo_1<0$. Because it is in the range of $\Delta Tx$, the conversion coefficient kc is taken to be zero, and the value 0 is substituted into $\Delta \theta ig_1=kc \times \delta_1$ results in $\Delta \theta ig_1=0$. Hence, the ignition timing correction value 0 is output. Next, at time $t0+2\Delta ts$, a similar calculation is performed and the ignition timing correction value 0 is output. Next, at time $t0+3\Delta ts$, $\delta_3=To_3-tTo_3>0$. The conversion coefficient kc is set to a predetermined value B and $\Delta \theta ig_3=kc \times \delta_3$ is output as the ignition timing correction value (retard). At time $t0+4\delta ts$, too, a similar calculation is performed. Until time t2, this routine is repeated to output the ignition timing correction value (retard).

At time t2, formula $\Delta \theta ig=(kc/N) \times \delta$ is used to calculate the ignition timing correction value. First, at time $t2+\Delta ts$, N=1 is substituted into the formula and $\Delta \theta ig=(kc/1) \times \delta$ is calculated. At time $t2+2\Delta ts$, N=2 is substituted into the formula and $\Delta \theta ig$ is calculated. At time $t2+3\Delta ts$, N=3 is substituted into the formula and $\Delta \theta ig$ is calculated. This procedure is repeated and each $\Delta \theta ig$ is outputted. At time t2, $\delta=To-tTo<0$. Because t2 is outside the range of $\Delta Tx$, the formula $\Delta \theta ig=(kc/N) \times \delta$ is used as it is to output the ignition timing correction value $\Delta \theta ig$. From this point forward, the ignition timing correction value is an advance. When the end point of target torque pattern tf is reached, the torque feedback control (ignition timing correction control) is ended.

According to this invention, the torque during gear shift changing is feedback-controlled to follow up the targeted torque, which is so set as to ensure smooth change from a gear position to the subsequent gear position. This eliminates the need to map and store in a ROM the engine torque control start and end timings and the engine torque control value (for example, ignition timing correction value), both of which have conventionally been tuned for each throttle valve opening and gear position. The tuning man-hour is significantly reduced, and hence the development time can be shortened. Because the targeted torque, which is set to ensure smooth transition from one gear position to another, is followed, the shift shocks can be greatly reduced. Furthermore, even when the engine changes with time or when the engine torque characteristic greatly deviates from the standard one while driving in a highland or in a very cold or hot district, a targeted torque is generated from the engine torque in such a situation, the engine torque is feedback-controlled, ensuring stable and smooth gear shift changing.

What is claimed is:

1. A powertrain control device for a vehicle comprising:
   an automatic transmission having a torque converter;
   a control device incorporating at least one microcomputer to control the engine and the automatic transmission;
   a driving torque calculating means for estimating the output shaft torque of the automatic transmission;
   a targeted torque generating means for generating a targeted torque based on the driving torque estimated by the driving torque calculating means;
   an engine torque control value calculating means for calculating a control value for controlling the output torque of the engine from the deviation between the targeted torque generated by the targeted torque generating means and the driving torque estimated by the driving torque calculating means;
   an engine torque control value limiting means provided in the engine torque control value calculating means, for limiting the engine torque control value below a specified value;
   an engine torque control means for controlling the output torque of the engine in response to a signal from the engine torque control value calculating means;
   an estimated driving torque monitoring means for monitoring the magnitude of the estimated driving torque calculated by the driving torque calculating means; and
   a line pressure control device for controlling a line pressure of the automatic transmission by use of the estimated driving torque monitoring means.

2. A powertrain control device according to claim 1, wherein when the estimated driving torque monitoring means decides that the line pressure of the automatic transmission is greater than a predetermined value, the line pressure control device controls the line pressure so that it is reduced by a specified value.

3. A powertrain control device according to claim 1, wherein when the estimated driving torque monitoring means judges that the line pressure of the automatic transmission is smaller than a predetermined value, the line pressure control device controls the line pressure so that it is increased by a specified value.

4. A powertrain control device according to claim 1, wherein the line pressure control device has a means for learning the line pressure at gear shift changing for selectively controlling the estimated output shaft torque estimated by the driving torque calculating means.

5. A powertrain control device for a vehicle comprising:
an automatic transmission having a torque converter;
a control device incorporating at least one microcomputer to control the engine and the automatic transmission;
a driving torque calculating means for estimating the output shaft torque of the automatic transmission;
a targeted torque generating means for generating a targeted torque based on the driving torque estimated by the driving torque calculating means;
an engine torque control value calculating means for calculating a control value for controlling the output torque of the engine from the deviation between the target torque generated by the target torque generating means and the driving torque estimated by the driving torque calculating means;
an engine torque control value limiting means provided in the engine torque control value calculating means, for limiting the engine torque control value above a specified value;
an engine torque control means for controlling the output torque of the engine in response to a signal from the engine torque control value calculating means;
a static line pressure determining means for determining line pressure of the automatic transmission during the normal traveling;
an estimated driving torque monitoring means for monitoring the magnitude of the estimated driving torque calculated by the driving torque calculating means;
a selecting means for selecting either the static line pressure determining means or the estimated driving torque monitoring means; and
a line pressure control device for controlling the line pressure of the automatic transmission according to the output from the selecting means.

6. A powertrain control device according to claim 5, wherein the engine torque control means changes the engine ignition timing correction value.

7. A powertrain control device according to claim 6, wherein the engine torque control value limiting means limits the engine ignition timing correction value so that the engine ignition timing correction value exceeds a predetermined value.

8. A powertrain control device for a vehicle comprising:
an engine;
an automatic transmission having a torque converter;
a control device incorporating at least one microcomputer for controlling the engine and the automatic transmission;
a driving torque calculating means for estimating the output shaft torque of the automatic transmission;
a targeted torque generating means for generating a targeted torque during gear shift changing based on the driving torque estimated by the driving torque calculating means;
an engine torque control value calculating means for calculating a control value used for controlling the output torque of the engine to eliminate the deviation between the targeted torque generated by the targeted torque generating means and the driving torque estimated by the driving torque calculating means; and
an engine torque control means for controlling the output torque of the engine in response to a signal from the engine torque control value calculating means.

9. A powertrain control device according to claim 8, wherein the driving torque calculating means includes a turbine torque calculating means for estimating the turbine torque, and the targeted torque generating means recognizes, as an actual gear shift changing timing, the time when the estimated turbine torque determined by the turbine torque calculating means in the driving torque calculating means becomes greater than a predetermined value with a predetermined time period after a shift command, temporarily stores, as a driving torque before gear shift changing, the driving torque at the actual gear shift changing timing or an average driving torque immediately before it, calculates the driving torque after the gear shift changing from the driving torque before the gear shift changing and the gear ratio before and after the gear shift changing, calculates the difference between the driving torques before and after the gear shift changing and an inclination angle with elapsed time of the targeted torque from a present gear shift changing time, and calculates the targeted torque according to the inclination angle every predetermined calculating cycle.

10. A powertrain control device according to claim 8, wherein the engine torque control value calculating means includes a means for calculating the deviation between the targeted torque value generated by the targeted torque generating means every predetermined calculation cycle and the driving torque value calculated by the driving torque calculating means, and an engine torque control value conversion means for calculating an engine torque control value by multiplying the deviation calculated by the deviation calculating means by a preset and stored conversion coefficient.

11. A powertrain control device according to claim 10, wherein the conversion coefficient is set to zero when the driving torque value is smaller than the targeted torque value with a first predetermined period from the actual gear shift changing timing; the conversion coefficient is set to a predetermined characteristic value when the driving torque value is greater than the targeted torque value within a second predetermined period, longer than the first period, after the actual gear shift changing timing; and within a period after the second predetermined period it is set to a value determined by dividing the predetermined characteristic value by the coefficient of the elapsed time.

12. A powertrain control device according to claim 8, wherein the driving torque calculating means includes a first driving torque calculating means for estimating the driving torque by using a prestored engine torque characteristic, a second driving torque by using a prestored torque converter characteristic, and a selecting means for selecting either the first of second driving torque calculating means in such a way that the second driving torque calculating means is used in a region where the torque converter slip is judged to be large and the first driving torque calculating means is used in a region where the torque converter slip is judged to be small so as to estimate the output shaft torque of the automatic transmission.

13. A powertrain control device according to claim 12, further comprising an accessory device torque learning means for learning and storing as a load torque of the engine accessory devices the deviation between the torques estimated by the first and second driving torque calculating means immediately before the selecting means switches from the second driving torque calculating means to the first driving torque calculating means, and after the switch from the second to the first driving torque calculating means, subtracts the accessory device torque stored in the accessory device torque learning means from the estimated torque given by the first driving torque calculating means to correct the load torque of the accessory devices.

14. A powertrain control device according to claim 12, wherein the first driving torque calculating means for estimating the driving torque by using the engine torque characteristic includes: an engine torque characteristic memory means for storing the engine torque characteristic beforehand; a means for calculating the slip ratio of the torque converter; a means for calculating the torque ratio of the torque converter based on the slip ratio information from the slip ratio calculating means; a turbine torque calculating means for calculating the output shaft torque of the torque converter by multiplying the engine torque read from the engine torque characteristic memory means by the torque ratio output from the torque ratio calculating means; and an automatic transmission output shaft torque calculating means for calculating the output shaft torque of the automatic transmission by multiplying the output shaft torque of the torque converter from the turbine torque calculating means by the gear ratio of the current gear position.

15. A powertrain control device according to claim 14, wherein the engine torque characteristic memory means stores the engine torque using the accelerator pedal opening or a throttle valve opening and the engine rotation speed as parameters.

16. A powertrain control device according to claim 14, wherein the engine torque characteristic memory means stores the engine torque using the intake air mass flow and the engine rotation speed as parameters.

17. A powertrain control device according to claim 16, wherein the engine torque characteristic memory means includes a means for calculating the intake air mass flow from the intake air pressure and the intake air temperature.

18. A powertrain control device according to claim 14, wherein the engine torque characteristic memory means stores the engine torque using the intake air pressure, the intake air temperature and the engine rotation speed as parameters.

19. A powertrain control device according to claim 14, wherein the engine torque characteristic memory means stores the engine torque using the pulse width for operating the fuel injector and an engine rotation speed as parameters.

20. A powertrain control device according to claim 12, wherein the second driving torque calculating means for estimating the driving torque by using the torque converter characteristic includes: an input capacity coefficient characteristic memory means for storing the characteristics of the input capacity coefficient from the torque converter beforehand; a means for calculating the slip ratio of the torque converter; a means to calculate a torque ratio of the torque converter based on the slip ratio information from the slip ratio calculating means; a torque converter input torque calculating means for calculating the input torque of the torque converter by multiplying the input capacity coefficient read from the input capacity coefficient characteristic memory means by a squared engine rotation speed signal from an engine rotation speed squaring means; a turbine torque calculating means for calculating the output shaft torque of the torque converter by multiplying the torque ratio from the torque ratio calculating means by the input torque of the torque converter from the torque converter input torque calculating means, and outputting the output shaft torque of the torque converter; and an automatic transmission output shaft torque calculating means for calculating the output shaft torque of the automatic transmission by multiplying the output shaft torque of the torque converter from the turbine torque calculating means by the gear ratio of the current gear position, and outputting the output shaft torque of the automatic transmission.

21. A powertrain control device for a vehicle having an engine, an automatic transmission, a torque converter, a transmission change signal generator for generating a transmission change signal at a transmission change timing, and a line pressure control device for controlling a line pressure of the automatic transmission, comprising:

at least one microcomputer to control the engine and the automatic transmission, wherein the powertrain control device has functions as follows:
(a) calculating a present output shaft torque of the automatic transmission;
(b) calculating a targeted torque based on the calculated present output shaft torque at a predetermined time after generating the transmission change signal;
(c) calculating an engine control value for controlling the output torque of the engine such that a deviation between the targeted torque and the present output shaft torque is reduced;
(d) calculating a line pressure control value for controlling the line pressure at the predetermined time based on the calculated present output shaft torque; and
(e) outputting an engine control signal for controlling the engine based on the calculated engine control value and a line pressure control signal for controlling the line pressure based on the calculated line pressure control value.

22. A powertrain control device according to claim 21, wherein the targeted torque is the same value as the present output shaft torque at the predetermined time after the transmission change signal.

23. A powertrain control device according to claim 21, wherein when the targeted torque reduces at a predetermined rate starting from the present output shaft torque at the predetermined time after the transmission change signal.

24. A powertrain control device according to claim 21, wherein the line pressure control value is decided based on a deviation between the present output shaft torque and a predetermined value which is calculated during a transmission change the last time.

* * * * *